(12) United States Patent
Barkan et al.

(10) Patent No.: US 8,479,997 B2
(45) Date of Patent: Jul. 9, 2013

(54) OPTICAL SCANNER WITH CUSTOMER INTERFACE

(75) Inventors: Edward D. Barkan, Miller Place, NY (US); John Britts, Port Jefferson Station, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 127 days.

(21) Appl. No.: 12/816,711

(22) Filed: Jun. 16, 2010

(65) Prior Publication Data

US 2011/0309147 A1    Dec. 22, 2011

(51) Int. Cl.
G06K 7/10    (2006.01)
G06K 15/00    (2006.01)

(52) U.S. Cl.
USPC ..................... 235/462.43; 235/383

(58) Field of Classification Search
USPC ................. 235/462.01–462.49, 383
See application file for complete search history.

(56) References Cited

U.S. PATENT DOCUMENTS

| 5,475,207 | A | * | 12/1995 | Bobba et al. | 235/462.4 |
| 5,834,708 | A | * | 11/1998 | Svetal et al. | 177/180 |
| 6,631,845 | B2 | | 10/2003 | Barkan | |
| 6,854,655 | B2 | | 2/2005 | Barkan | |
| 2003/0201329 | A1 | | 10/2003 | Kumagai et al. | |
| 2009/0039166 | A1 | * | 2/2009 | Herwig et al. | 235/462.42 |

OTHER PUBLICATIONS

International Search Report & Written Opinion mailed on Sep. 30, 2011 for International Application No. PCT/US2011/037334.

* cited by examiner

Primary Examiner — Jamara Franklin
(74) Attorney, Agent, or Firm — Nong-Qiang Fan

(57) ABSTRACT

A multi-window scanner (10) and method (500) of operating multi-window scanner for imaging a target object (44) and auxiliary object (204) includes a housing (16) supporting a first window assembly (22) for scanning a target barcode (42). The scanner also comprises a first scanning system (34) having one of an imaging camera (208/209) and a laser light source (38) positioned within the housing defining a field of view for reading the target barcode upon the target object. The scanner further comprises a second window assembly for reading auxiliary data (206) from an auxiliary object (204) relating to one or more target objects being scanned and a second scanning system (202) positioned within the housing for imaging the auxiliary data from the auxiliary object through the second window assembly (28).

18 Claims, 14 Drawing Sheets

OPTICAL SCANNER WITH CUSTOMER INTERFACE

TECHNICAL FIELD

The present disclosure relates to an optical scanner having a customer interface, and more specifically, multiple camera imaging-based barcode reader or laser scanner with an imaging camera as a customer interface.

BACKGROUND

Various electro-optical systems have been developed for reading optical indicia, such as barcodes. A barcode is a coded pattern of graphical indicia comprised of a series of bars and spaces of varying widths, the bars and spaces having differing light reflecting characteristics. The pattern of the bars and spaces encode information. Barcode may be one dimensional (e.g., UPC barcode) or two dimensional (e.g., DataMatrix barcode). Systems that read, that is, image or scan and decode barcodes employing imaging camera systems or laser scanner systems are typically referred to as optical scanners or barcode scanners.

Optical scanners may be portable or stationary. A portable optical scanner is one that is adapted to be held in a user's hand and moved with respect to target indicia, such as a target barcode, to be read that is, imaged or scanned and decoded. Some stationary optical scanners are mounted in a fixed position, for example, relative to a point-of-sales counter. Examples of such point-of-sale optical scanners are further described in U.S. Pat. No. 6,631,845 entitled TWO WINDOW OPTICAL SCANNER that issued Oct. 14, 2003 and U.S. Pat. No. 6,854,655 entitled TWO WINDOW OPTICAL SCANNER that issued Feb. 15, 2005. Both the U.S. Pat. Nos. 6,631,845 and 6,854,655 are incorporated herein by reference in their entireties.

Target objects, such as a product package that includes a target barcode are moved or swiped past one of the one or more transparent windows and thereby pass within a field-of-view of the stationary optical scanners. The optical scanner typically provides an audible and/or visual signal to indicate the target barcode has been successfully imaged or scanned and decoded. Sometimes barcodes are presented, as opposed to swiped. This typically happens when the swiped barcode failed to scan, so the operator tries a second time to scan it. Alternately, presentation is done by inexperience users, such as when the reader is installed in a self check out installation.

A typical example where a stationary optical scanner would be utilized includes a point of sale counter/cash register where customers pay for their purchases. The optical scanner is typically enclosed in a housing that is installed in the counter and normally includes a vertically oriented transparent window and/or a horizontally oriented transparent window, either of which may be used for reading the target barcode affixed to the target object, i.e., the product or product packaging for the product having the target barcode imprinted or affixed to it. The sales person (or customer in the case of self-service check out) sequentially presents each target object's barcode either to the vertically oriented window or the horizontally oriented window, whichever is more convenient given the specific size and shape of the target object and the position of the barcode on the target object.

A stationary optical scanner for reading barcodes typically has a plurality of imaging cameras can be referred to as a multi-camera imaging-based scanner or barcode reader. In a multi-camera imaging reader, each camera system typically is positioned behind one of the plurality of transparent windows such that it has a different field-of-view from every other camera system. While the fields of view may overlap to some degree, the effective or total field-of-view of the reader is increased by adding additional camera systems. Hence, the desirability of multicamera readers as compared to signal camera readers which have a smaller effective field-of-view and require presentation of a target barcode to the reader in a very limited orientation to obtain a successful, decodable image, that is, an image of the target barcode that is decodable.

The camera systems of a multi-camera imaging reader or multi-camera optical scanner may be positioned within the housing and with respect to the transparent windows such that when a target object is presented to the housing for reading the target barcode on the target object, the target object is imaged by the plurality of imaging camera systems, each camera providing a different image of the target object. Further explanation of this concept is discussed in U.S. patent application Ser. No. 11/862,568 filed Sep. 27, 2007 entitled MULTIPLE CAMERA IMAGING BASED BARCODE READER and Ser. No. 12/241,153 filed Sep. 30, 2008 entitled IMAGING DUAL WINDOW SCANNER WITH PRESENTATION SCANNING, which are assigned to the assignee of the present invention and are incorporated herein by reference.

SUMMARY

One example embodiment of the present disclosure includes a multi-window scanner comprising a housing supporting a first window assembly for scanning a target barcode on a target object in which the target object is positioned in relation to the housing for reading the target barcode. The multi-window scanner also comprises a first scanning system having one of an imaging camera and a laser light source positioned within the housing interior region defining a field of view for reading the target barcode upon the target object. The multi-window scanner further comprises a second window assembly for reading auxiliary data from an auxiliary object relating to one or more target objects being scanned and a second scanning system positioned within the housing interior region for imaging the auxiliary data from the auxiliary object through the second window assembly.

Another example embodiment of the present disclosure includes a method of operating multi-window scanner for imaging a target object and auxiliary object comprising positioning a target barcode on a target object by locating the target object in relation to a first window assembly of a multi-window scanner. The method also comprises scanning the target barcode on the target object with a first scanning system comprising one of an imaging camera and a laser light source positioned within a housing interior region of the multi-window scanner. The method further comprises positioning auxiliary data from an auxiliary object relating to one or more target objects being scanned by locating the auxiliary object in relation to a second window assembly of the multi-window scanner. The method yet further comprises scanning the auxiliary data on the auxiliary object with a second scanning system positioned within the housing interior region for imaging the auxiliary data from the auxiliary object through the second window.

A further example embodiment of the present disclosure includes a multi-window scanner having a customer interface comprising a housing supporting first window and second window assemblies, said first window assembly being located on a first side of said housing and said second window assembly being located on a second side of said housing opposite said first side. The first window assembly comprising one substantially vertically oriented transparent window and one substantially horizontally oriented transparent window. The second window assembly comprising a third window system. The scanner further comprises a first scanning system comprising one of an imaging camera and a laser light source positioned within the housing interior region defining a first field of view through said first window assembly. The scanner also comprises a second scanning system positioned within said housing interior region defining a second field of view through said second window assembly.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Referring now to the figures generally wherein like numbered features shown therein refer to like elements throughout unless otherwise noted. The present disclosure relates to an optical scanner having a customer interface, and more specifically, multiple camera imaging-based or laser based barcode reader having a customer interface.

Figure 1:
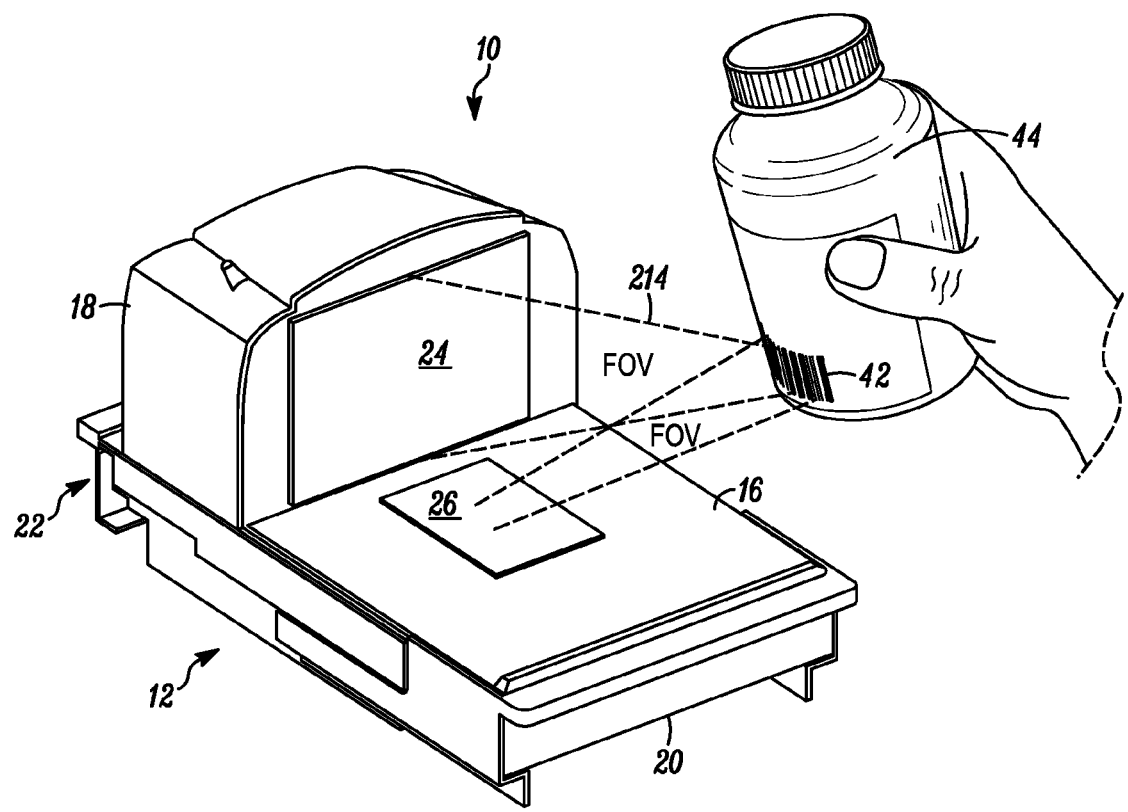
FIG. 1 is a front perspective view of an optical scanner having a customer interface constructed in accordance with one example embodiment of the present disclosure.

FIG. 1 is a front perspective view of an optical scanner, apparatus, and system 10 comprising a customer interface constructed in accordance with one example embodiment of the present disclosure. The optical scanner 10 comprises a front or first side 12 juxtaposed to a rear or a second side 14 illustrated in the rear perspective view of FIG. 2. The optical scanner 10 further comprises a housing 16 having an upper housing arrangement 18 and a lower housing arrangement 20. The housing 16, both upper and lower arrangements 18 and 20, respectively in one example embodiment are constructed of plastic, but could be made from any other material of similar weight and/or strength.

The front side 12 of the housing 16 supports a first window assembly 22. The first window assembly 22 comprises a substantially vertically oriented transparent window 24 and a substantially horizontally oriented transparent window 26.

The rear side 14 of the housing 16 supports a second window assembly 28. The second window assembly 28 comprises a substantially vertically oriented transparent window 30.

Figure 2:
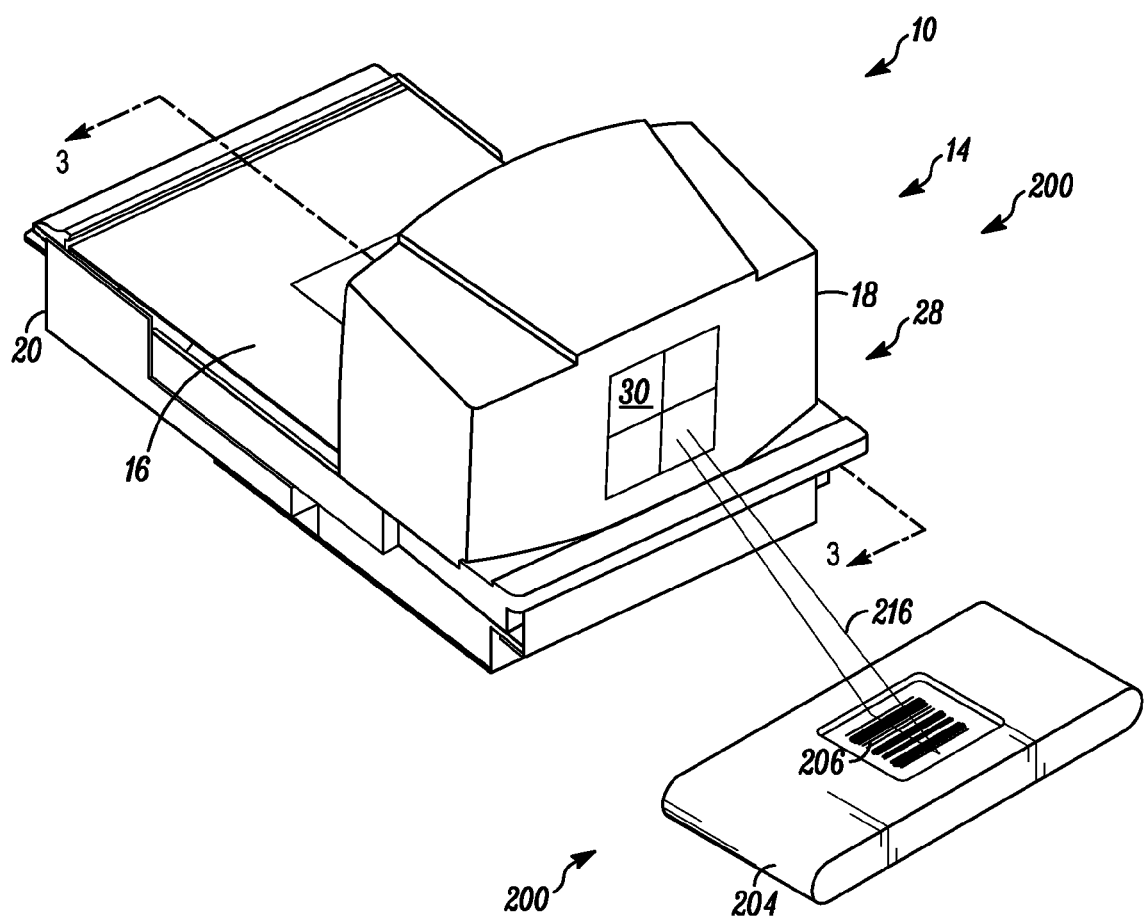
FIG. 2 is a rear perspective view of an optical scanner having a customer interface constructed in accordance with one example embodiment of the present disclosure.
Figure 3:
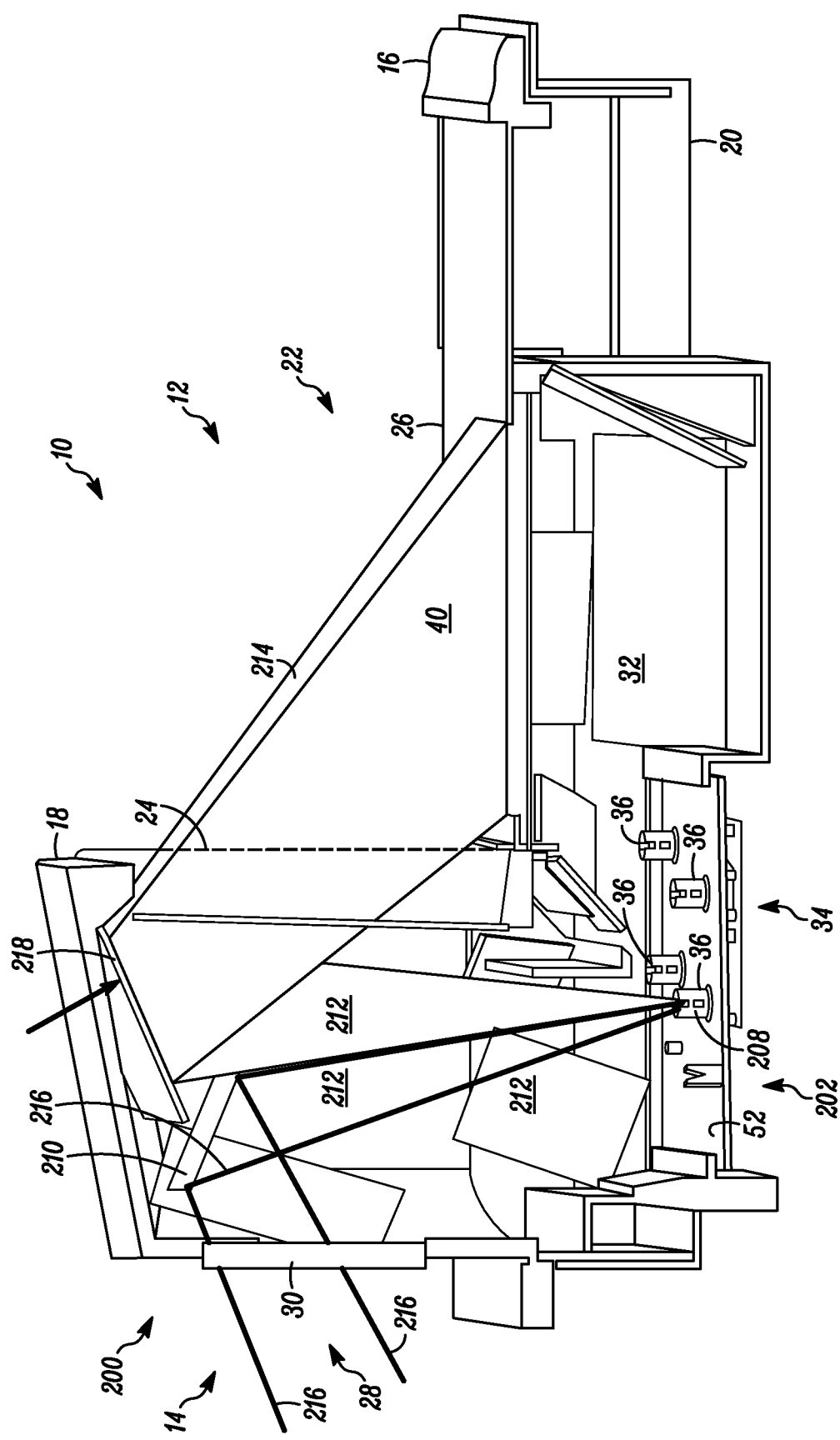
FIG. 3 is a medial cross sectional view of the optical scanner having a customer interface of FIG. 2 along section lines 3-3.

The housing 16 encloses an interior region 32 as illustrated in the medial cross sectional view in FIG. 3 of the optical scanner 10 of FIG. 2 along section lines 3-3. The interior region 32 supports a first scanning system 34. In one example embodiment illustrated in FIGS. 3-6, the first scanning system 34 comprises a plurality of imaging cameras 36 supporting an imaging system with independent fields of view ("FOV") 40 imaging and reading a target barcode 42 located on a target object 44. In the illustrated embodiments of FIGS. 3-6, the target object 44 in the form of a package includes a target barcode 42 that is presented or swiped in the FOV 40 of the optical scanner 10 along the front or first side 12. The target object 44 is typically held or scanned by an employee selling the product at a point of sale and the optical scanner is positioned within the countertop.

Figure 7:
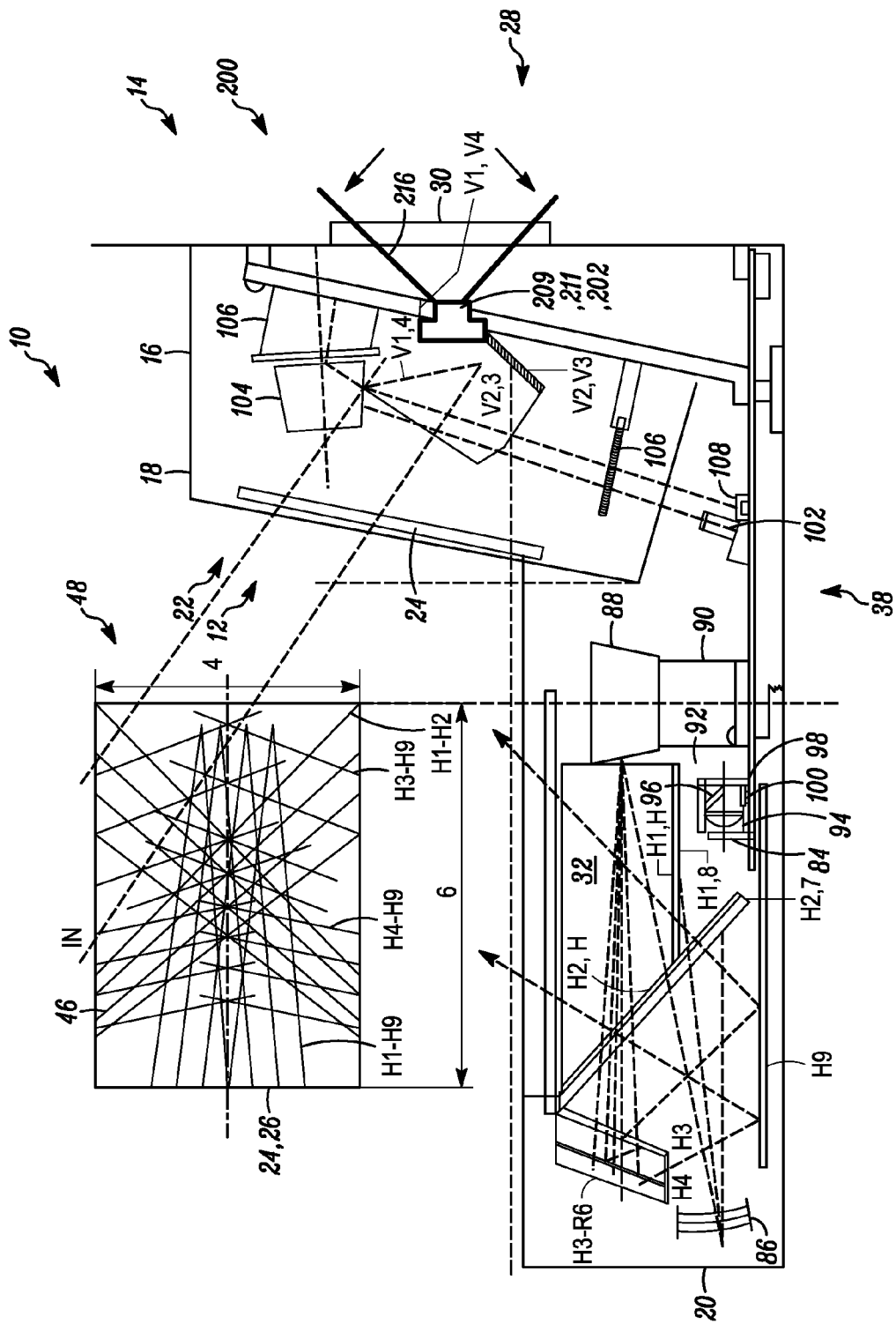
FIG. 7 is a medial cross sectional view of an optical scanner having a customer interface constructed in accordance with another example embodiment of the present disclosure.

In another example embodiment illustrated in FIG. 7, the first scanning system 34 comprises a laser scanning assembly 38 supporting a plurality of laser scan lines 46 collectively forming a scanning FOV 48 for the laser scanning assembly along the vertical and horizontal windows 24 and 26, scanning and reading the target barcode 42 (see FIG. 1) located on the target object 44. In the illustrated embodiments of FIG. 7, the target object 44 in the form of a package includes a target barcode 42 that is presented or swiped in the FOV 48 of the optical scanner 10 along the front or first side 12. The target object 44 is typically being held or scanned by an employee selling the product at a point of sale and the optical scanner is positioned within the countertop.

Figure 8:
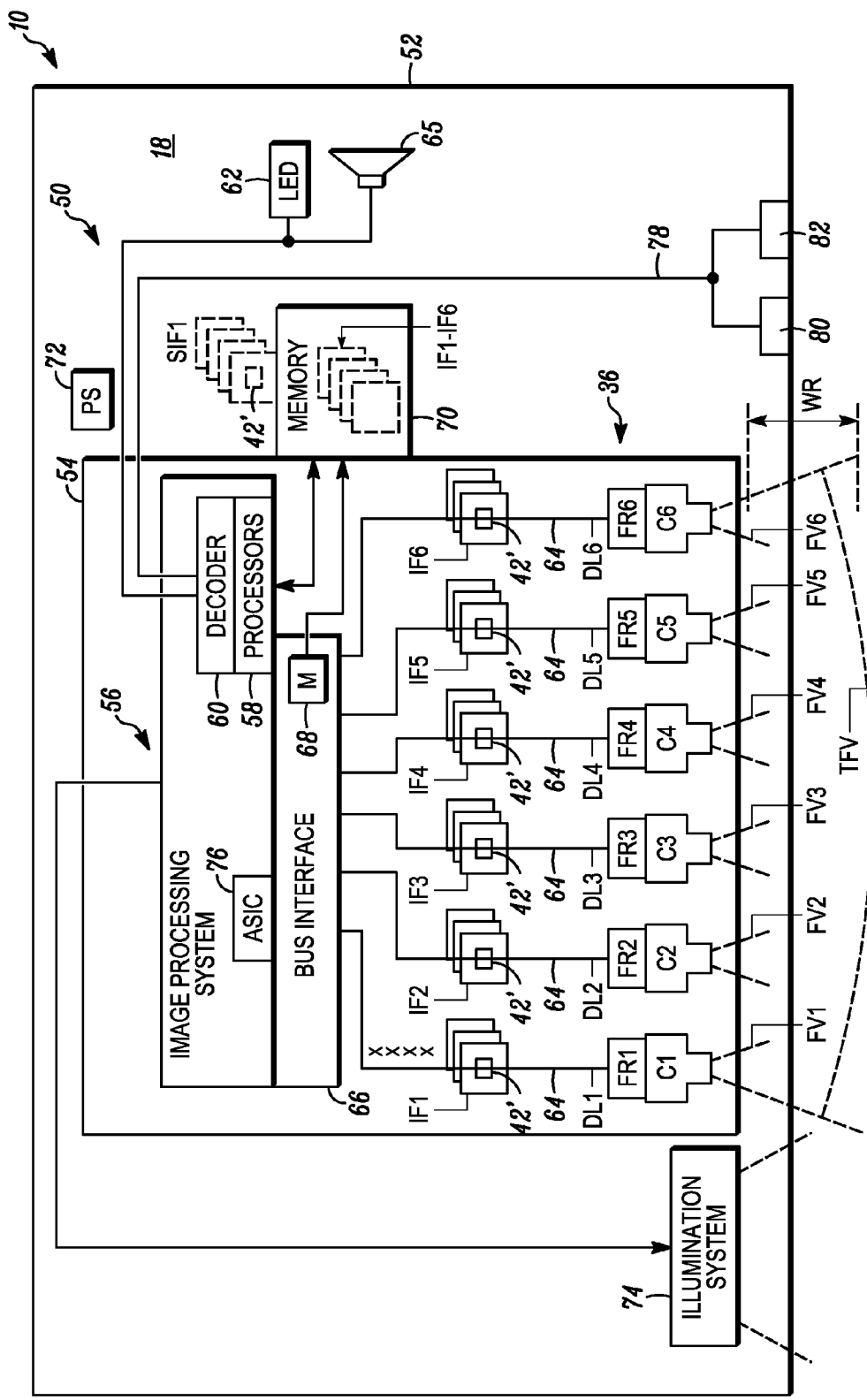
FIG. 8 is a schematic block diagram of selected systems and electrical circuitry of an optical scanner having a customer interface constructed in accordance with one example embodiment of the present disclosure.

Referring now to FIG. 8 is a schematic block diagram of selected systems and electrical circuitry of an optical scanner 10 having a customer interface constructed in accordance with example embodiments (namely FIGS. 3-6) of the present disclosure wherein the first scanning system 34 comprises a plurality of camera 36. As depicted in FIG. 8, the optical scanner with a customer interface 10 includes circuitry 50 located on a printed circuit board 52 ("PCB") comprising an image system 54 which includes the plurality of imaging cameras 36 represented by C1, C2, C3, C4, C5, C6, which produce raw gray scale images, and an image processing system 56, which includes one or more processors 58 and a decoder 60 that analyzes the gray scale images from the cameras and decodes imaged target barcodes, if present. The imaging system 54 is capable of reading, that is, imaging and decoding both 1D and 2D barcodes and postal codes. The optical scanner 10 in the example embodiment of FIG. 8 is also capable of capturing images and signatures. The decoder 60 may be integrated into the optical scanner 10 or may be a separate system, as would be understood by one of skill in the art.

In one exemplary embodiment, the optical scanner 10 is stationary and the image and decoder systems are supported within the interior region 32 of the housing 16 (see FIGS. 3-6). The housing 16 may be integrated into a sales counter of a point of sales system that includes, for example, a cash register, a touch screen visual display or other type user interface and a printer for generating sales receipts.

In the exemplary embodiment of FIG. 8 comprising the first scanning system 34 having a plurality of cameras 36, the cameras C1-C6 are mounted to the printed circuit board 52 inside the housing 16 and each camera defines a two-dimensional field-of-view FV1, FV2, FV3, FV4, FV5, FV6 projected from either the vertical oriented window 24 or horizontal window 26. Positioned behind and adjacent to the windows 24 and 26 are reflective mirrors M in that help define a given camera field-of-view such that the respective fields-of-view FV1-FV6 pass from the housing 16 through the windows, creating an effective total field-of-view (TFV) for the optical scanner 10 in a region of the windows outside the housing. Because each camera C1-C6 has an effective working range WR (shown schematically in FIG. 8) over which a target barcode 42 may be successfully imaged and decoded, there is an effective target area in front of the windows 24 and 26 within which a target barcode 42 presented for reading may be successfully imaged and decoded.

Upon a successful reading of the target barcode 42 upon the target object 44, a visual and/or audible signal will be generated by the optical scanner 10, indicating to the sales operator that the target barcode 42 on the target object 44 has been successfully imaged and decoded. The successful read indication may be in the form of illumination of a light emitting diode ("LED") 62 (see FIG. 8) and/or generation of an audible sound by a speaker 64 upon appropriate signal from the decoder 60.

Each camera in the plurality of camera, namely C1-C6 of the imaging system 54 captures a series of image frames of its respective field-of-view FV1-FV6. While six cameras are currently shown more "CN" or less cameras can be used without departing from the spirit and scope of the present disclosure. For example, as will be discussed below, the customer interface may share one of the cameras C1-C6 or require an additional dedicated camera CN. Independent of whether the customer interface shares one of the cameras C1-C6 or has its own dedicated camera CN, the processing of the image from the customer interface occurs the same as any of the cameras C1-C6 described herein.

The series of image frames for each camera assembly C1-C6 is shown schematically as IF1, IF2, IF3, IF4, IF5, IF6 in FIG. 8. Each series of image frames IF1-IF6 comprises a sequence of individual image frames generated by the respective cameras C1-C6. As seen in the drawings, the designation IF1, for example, represents multiple successive images obtained from the camera C1. As is conventional with imaging cameras, the image frames IF1-IF6 are in the form of respective digital signals representative of raw gray scale values generated by each of the camera assembly C1-C6.

The image processor or processors 58 controls the operation of the cameras C1-C6. The cameras C1-C6, when operated during an imaging system, generate digital signals 64. The signals 64 are raw, digitized gray scale values, which correspond to a series of generated image frames for each camera. For example, for the camera C1, the signal 64 corresponds to digitized gray scale values corresponding to a series of image frames IF1. For the camera C2, the signal 64 corresponds to digitized gray scale values corresponding to a series of image frame IF2, and so on. The digital signals 64 are coupled to a bus interface 66, where the signals are multiplexed by a multiplexer 68 and then communicated to a memory 70 in an organized fashion so that the processor 58 knows which image representation belong to a given camera.

The image processors 58 access the image frames IF1-IF6 from memory 70 and search for image frames that include an imaged target barcode 42'. If the imaged target barcode 42' is present and decodable in one or more image frames, the decoder 60 attempts to decode the imaged target barcode 42' using one or more of the image frames having the imaged target barcode 42' or a portion thereof.

Each camera C1-C6 of the plurality of camera 36 includes a charged coupled device (CCD), a complementary metal oxide semiconductor (CMOS), or other imaging pixel array, operating under the control of the imaging processing system 56. In one exemplary embodiment, the sensor array comprises a two-dimensional (2D) CMOS array with a typical size of the pixel array being on the order of 752×480 pixels. The illumination-receiving pixels of the sensor array define a sensor array surface secured to a printed circuit board for stability. The sensor array surface is substantially perpendicular to an optical axis of the imaging lens assembly, that is, a z axis that is perpendicular to the sensor array surface would be substantially parallel to the optical axis of the focusing lens. The pixels of the sensor array surface are disposed in an orthogonal arrangement of rows and columns of pixels.

The optical scanner 10 circuitry 50 also includes a power supply 72. The power supply 72 is electrically coupled to and provides power to the circuitry 50 of the optical scanner 10. In another example embodiment, the optical scanner 10 includes an illumination system 74 (shown schematically in FIG. 8), which provides illumination to illuminate the effective total field-of-view to facilitate obtaining an image 42' of a target barcode 42 that has sufficient resolution and clarity for decoding.

For each camera assembly C1-C6, the sensor array is enabled during an exposure period to capture an image of the field-of-view FV1-FV6 of the camera assembly. The field-of-view FV1-FV6 is a function of both the configuration of the sensor array and the optical characteristics of the imaging lens assembly and the distance and orientation between the array and the lens assembly.

If the target barcode 42 is within the field-of-view of a particular camera assembly, say camera C1, each image frame of the series of image frames IF1 includes an image 42' of the target barcode 42 (shown schematically in FIG. 8). The image processors 58 and the decoding system 60 select an image frame from the series of image frames IF1-IF6 stored in the memory 70 and attempt to locate and decode a digitized, gray scale version of the image barcode 42'.

The camera assemblies C1-C6 are continuously generating respective series of image frames IF1-IF6. Since many of these captured frames IF1-IF6 will not include an imaged target barcode 42', the image processors 58 of the image processing system 56 must analyze the stored image frames IF1-IF6 in memory 70 to find and decode.

For each camera assembly C1-C6, electrical signals are generated by reading out of some or all of the pixels of the pixel array after an exposure period generating the gray scale value digital signal 64. This occurs as follows: within each camera, the light receiving photosensor/pixels of the sensor array are charged during an exposure period. Upon reading out of the pixels of the sensor array, an analog voltage signal is generated whose magnitude corresponds to the charge of each pixel read out. The image signals 64 of each camera assembly C1-C6 represents a sequence of photosensor voltage values, the magnitude of each value representing an intensity of the reflected light received by a photosensor/pixel during an exposure period.

Processing circuitry of the camera assembly, including gain and digitizing circuitry, then digitizes and converts the analog signal into a digital signal whose magnitude corresponds to raw gray scale values of the pixels. The series of gray scale values (GSV) represent successive image frames generated by the camera assembly. The digitized signal 64 comprises a sequence of digital gray scale values typically ranging from 0-255 (for an eight bit A/D converter, i.e., $2^8=256$), where a 0 gray scale value would represent an absence of any reflected light received by a pixel during an exposure or integration period (characterized as low pixel brightness) and a 255 gray scale value would represent a very intense level of reflected light received by a pixel during an exposure period (characterized as high pixel brightness). In some sensors, particularly CMOS sensors, all pixels of the pixel array are not exposed at the same time, thus, reading out of some pixels may coincide in time with an exposure period for some other pixels.

As is best seen in FIG. 8, the digital signals 64 are received by the bus interface 66 of the image processing system 56, which may include the multiplexer 68, operating under the control of an application specific integrated circuit (ASIC) 76, to serialize the image data contained in the digital signals 64. The digitized gray scale values of the digitized signal 64 are stored in the memory 70. The digital gray scale values GSV constitute a digitized gray scale version of the series of image frames IF1-IF6, which for each camera assembly C1-C6 and for each image frame is representative of the image projected by the imaging lens assembly onto the pixel array during an exposure period. If the field-of-view of the imaging lens assembly includes the target barcode 42, then a digital gray scale value image 42' of the target barcode 42 would be present in the digitized image frame.

The decoding circuitry 60 then operates on selected image frames and attempts to decode any decodable image within the image frames, e.g., the imaged target barcode 42'. If the decoding is successful, decoded data 78, representative of the data/information coded in the target barcode 42 is then output via a data output port 80 and/or displayed to a user of the optical scanner 10 via a display 82. Upon achieving a good read of the target barcode 42, that is, the barcode 42 was successfully imaged and decoded, the speaker 65 and/or an indicator LED 62 is activated by the barcode reader circuitry 50 to indicate to the sales clerk that the target barcode 42 has successfully read.

Referring again to FIG. 7, the optical scanner 10 is illustrated in accordance with another example embodiment of the present disclosure wherein the first scanning system 34 comprises the laser scanning assembly 38. Situated within the lower housing arrangement 20 is a light source 84, preferably a laser, generates light beam that is reflected off spherical reflector/collector 86 and onto rotating polygon minor 88. In one example embodiment, the rotating polygon mirror 88 has four reflecting facets rotating around a vertical axis and is driven by motor 90. The light beam is then reflected from the minor 88 onto an array of minors located in the interior region 32 of the housing 16 and out the horizontal window 26.

A target object 44 when positioned within the scan lines 46 forming the laser FOV 48, light is reflected from the target barcode 42 back through horizontal window 26 off one or more internal minors therein, to the rotating polygon minor 88 and spherical reflector/collector 86. This light reflected off the reflector/collector 86 projects onto a collection assembly 92, which comprises lens 94, fold minor 96, filter 98, and photodiode 100.

Situated within the upper housing arrangement 22 is a light source 102, preferably a laser, generates light beam that is reflected off and onto rotating polygon minor 104. In one example embodiment, the rotating polygon minor 104 has four reflecting facets rotating around a vertical axis and is driven by motor 106. The light beam is then reflected from the minor 104 onto an array of minors located in the interior region 32 of the housing 16 and out the vertical window 24.

A target object 44 when positioned within the scan lines 46 forming the laser FOV 48, light is reflected from the target barcode 42 back through vertical window 24 off one or more internal minors therein, to the rotating polygon minor 104, which it is then reflected toward collector lens. This light reflected off the reflector/collector 86 projects onto a collection assembly 92, which comprises lens 94, fold minor 96, filter 98, and photodiode 100.

Each photodiode 100 and 108 has its own amplifier and digitizer and the outputs of the digitizers go to a decoder designed to accept two digitized signals simultaneously. The decoded signal is then output to a host computer forming a mnemonic or understandable output signal as appreciated by one skilled in the art. Further details of a laser scanning assembly 38 is described in U.S. Pat. No. 6,854,655 entitled TWO WINDOW OPTICAL SCANNER, which is incorporated herein by reference in its entirety.

As described in detail above, the optical scanner 10 of the present disclosure includes a first scanning system 34 in either the form of a plurality of imaging cameras 36 (shown in FIGS. 3-6 and 8) or laser scanning assembly 38 (shown in FIG. 7). The first scanning system 34 is employed on the first or front side 12 of the optical scanner 10 using the first window assembly 22 comprising the vertical and horizontal windows 24 and 26, respectively.

As appreciated by one skilled in the art, the optical scanner 10 is positioned in a countertop and the operator or sales clerk will typically scan products to be purchased using the first scanning system 34 on the first or front side 12 as illustrated by the target object 44 in FIG. 1. In a conventional system, the consumer stands opposite the operator where neither of the two windows 24 and 26 on the front side 12 can be accessed for scanning There are, however, some situations where it would be advantageous for the consumer located on the rear or second side 14 of the optical scanner 10 to be able to scan. In particular, new applications are being developed where barcodes such as soft barcodes are being displayed on consumer's cell phones, for presenting to the scanner at the time a product is being purchased to receive a discount or other offer. In addition, some retailers are allowing consumers to use a barcode displayed on their cell phone to replace the loyalty cards offered by many retailers. There are also occasions where the retailers need to scan the barcode on a consumer's driver's license for age verification, forms population, etc. In other cases, it would also be advantageous if a consumer could scan paper discount coupons while the store employee is scanning items for purchase, to reduce overall transaction time.

The present disclosure advantageously enables a consumer, customer, or person standing opposite the first or front side 12 of the optical scanner 10 to scan auxiliary data from auxiliary objects by a customer interface 200 (see FIG. 2) located on the second or rear side 14 of the optical scanner. The scanning of auxiliary data through the customer interface 200 can occur simultaneously on the second side using a second scanning system 202 while the first scanning system 34 is being used on the front or first side 12.

The customer interface 200 comprises the second scanning system 202 and second window assembly 28. In the illustrated example embodiment of FIG. 2, the second window assembly 28 comprising the vertically oriented window 30 is positioned in the upper housing arrangement 18 in such a way that it is on the back or top of the housing 16 that extends above the countertop surface. In this location, the customer can easily present an auxiliary target object 204 having auxiliary target data 206 to be scanned such as a cell phone shown in FIG. 2, wherein the auxiliary data 206 is in the form of a barcode that may include information such as, customer loyalty, age, geographical, and coupon or discount data.

In the illustrated example embodiment of FIG. 2, the auxiliary data 206 being scanned is a soft barcode on a cell phone. Further discussion regarding scanning, reading, and imaging soft barcodes on cell phones can be found in U.S. patent application Ser. No. 12/040,304 entitled IMAGING SYSTEM FOR READING MOBILE DEVICE INDICIA filed Feb. 29, 2008. The Ser. No. 12/040,304 application which is assigned to the assignee of the present application is incorporated herein by reference in its entirety.

The customer interface 200 eliminates advantageously the need to transfer coupons, identification, or cell phones to the clerk or operator. Some people are reluctant to hand their cell phones to a stranger, and if the store employee, clerk, or operator drops the phone, the store will likely be responsible for repairing it. In addition, when the consumer performs his or her own scanning, there is no possibility of transferring colds, flue, etc. between the customer and employee. The customer interface 200 advantageously eliminates such issues. The customer interface 200 also enables customer scanning without adding any hardware to the cramped checkout areas typically found in stores and is achieved in such a way that requires no change in the ergonomics of scanning for the store employees.

Referring again to the figures and in particular to FIG. 3 is a medial cross sectional elevation view of the optical scanner 10 having a customer interface 200 of FIG. 2 along section lines 3-3 constructed in accordance with one embodiment of the present disclosure. As stated above, the example embodiment of FIG. 3 illustrates a first scanning system 34 for imaging a target object 44 having a target barcode 42 on the first side 12 of the optical scanner 10 using a plurality of imaging cameras 36 and the image of the auxiliary data 206 is processed in the same manner as described in FIG. 8. The imaging and reading of the target barcode 42 is achieved by the process described above relating to FIG. 8. In addition to target barcodes 42, other indicia such as signature codes, fingerprint, soft barcodes, 1D and 2D barcodes, and the like can be imaged and read without departing from the spirit and scope of the claimed invention.

In the illustrated example embodiment of FIG. 3, the customer interface 200 is shown on the rear side 14 of the optical scanner 10 housing 16. The customer interface 200 comprises the second scanning system 202 that includes in the example embodiment of FIG. 3 a common camera 208 that is shared with the first scanning system 34 plurality of cameras 36. The second scanning system 202 further comprises a splitter mirror 210 that divides the FOV 212 of common camera 208 into a first field of view 214 for imaging the target barcode 42 of the target object 44 out the first window assembly 22 and a second field of view 216 for imaging a target object such as auxiliary data 206 found on an auxiliary object 204 out the second window assembly 28 at different or the same time.

The common camera 208 of FIG. 3 scans the auxiliary data 206 in the same manner described and shown in FIG. 8 as that of the target object 44. In addition to auxiliary data 206 being in form of a soft barcode on a cell phone (see FIG. 2), other indicia such as signature codes, fingerprint, hard and soft barcodes, 1D and 2D barcodes, and the like can be imaged and read without departing from the spirit and scope of the claimed invention. The second FOV 216 of the second scanning system 202 projected through the second window assembly 28 provides an area for the auxiliary object 204 to be positioned and imaged as illustrated in FIG. 2 within the customer interface 200. In the illustrated example embodiment of FIG. 3, a separate illumination source is not required for auxiliary objects 206 positioned in environments with sufficient lighting or in situations where backlighting is provided for example by a cell phone.

In the illustrated example embodiment of FIG. 3, the first FOV 214 is projected through the substantially vertical window 24 along with other FOVs from the plurality of cameras 36 and more particularly, the common camera 208 for imaging the target object 44. In the illustrated embodiment of FIG. 3, the first FOV 214 projection path through the substantially vertical window 24 is achieved by a fold mirror 218. Other FOVs from the plurality of cameras 36 for imaging the target object 44 are also projected from the horizontal widow 26 and/or vertical window 24.

Figure 4:
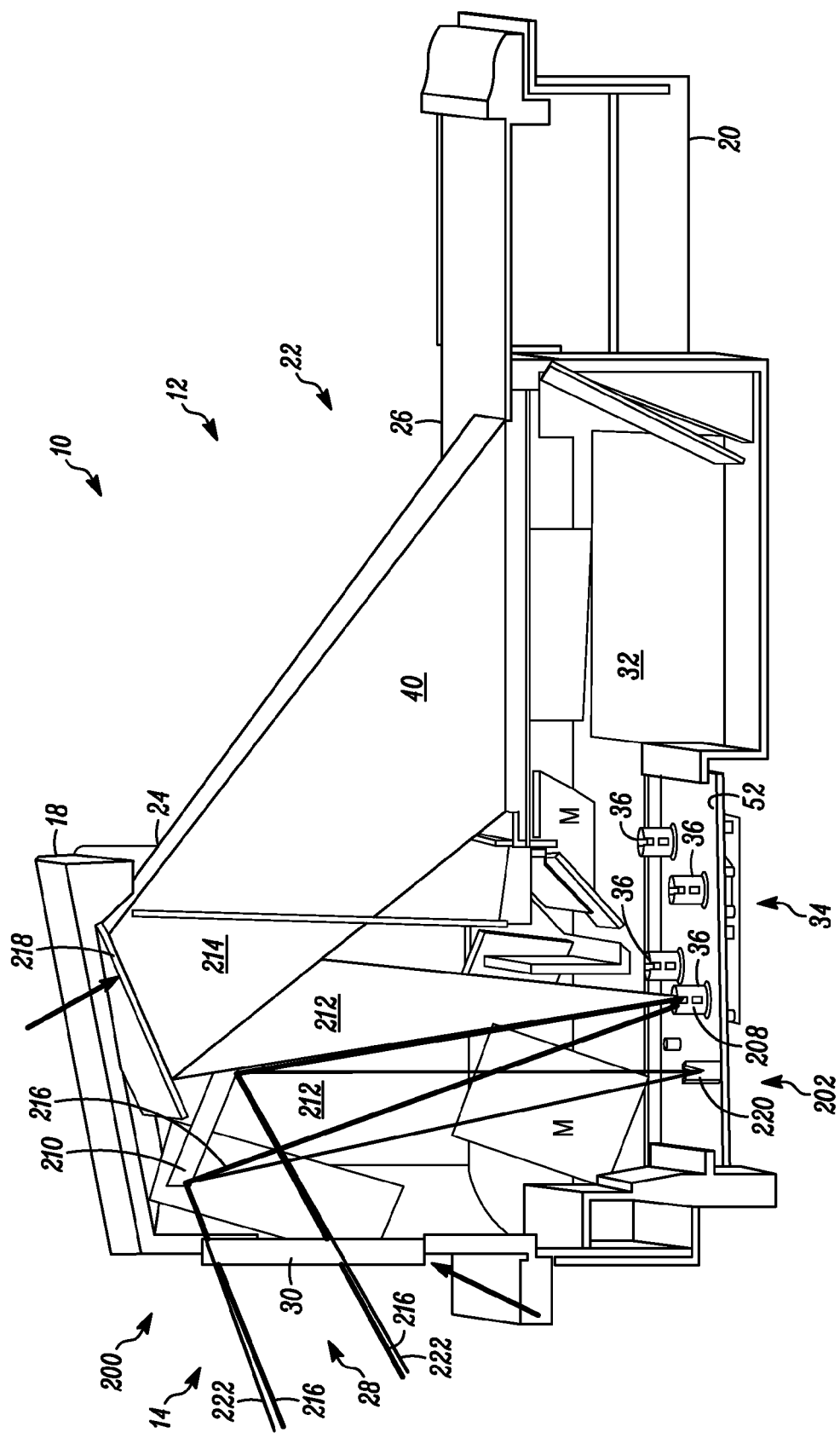
FIG. 4 is a medial cross sectional view of an optical scanner having a customer interface constructed in accordance with another example embodiment of the present disclosure.

Referring again to the figures and in particular to FIG. 4 is a medial cross sectional elevation view of the optical scanner 10 having a customer interface 200 constructed in accordance with one embodiment of the present disclosure. As stated above, the example embodiment of FIG. 4 illustrates a first scanning system 34 for imaging a target object 44 having a target barcode 42 on the first side 12 of the optical scanner 10 using a plurality of imaging cameras 36. The imaging and reading of the target barcode 42 is achieved by the process described above relating to FIG. 8. In addition to target barcodes 42, other indicia such as signature codes, fingerprint, soft barcodes, 1D and 2D barcodes, and the like can be imaged and read without departing from the spirit and scope of the claimed invention.

In the illustrated example embodiment of FIG. 4, the customer interface 200 is shown on the rear side 14 of the optical scanner 10 housing 16. The customer interface 200 comprises the second scanning system 202 that includes in the example embodiment of FIG. 4 a common camera 208 that is shared with the first scanning system 34 plurality of cameras 36. The second scanning system 202 further comprises a splitter minor 210 that divides the FOV 212 of common camera 208 into a first field of view 214 for imaging the target barcode 42 of the target object 44 out the first window assembly 22 and a second field of view 216 for imaging a target object such as auxiliary data 206 found on an auxiliary object 204 out the second window assembly 28 at different or the same time.

The common camera 208 of FIG. 4 scans the auxiliary data 206 in the same manner described and shown in FIG. 8 as that of the target object 44. In addition to auxiliary data 206 being in form of a soft barcode on a cell phone (see FIG. 2), other indicia such as signature codes, fingerprint, hard and soft barcodes, 1D and 2D barcodes, and the like can be imaged and read without departing from the spirit and scope of the claimed invention. The second FOV 216 of the second scanning system 202 projected through the second window assembly 28 provides an area for the auxiliary object 204 to be positioned and imaged as illustrated in FIG. 2 within the customer interface 200. In the illustrated example embodiment of FIG. 4, a separate illumination source 220 is part of the second scanning system 202 used to increase the lighting for auxiliary objects 206 positioned in environments with deficient lighting or in situations where backlighting is not provided.

The separate illumination source 220 in the example embodiment of FIG. 4 is positioned and coupled to the surface of the PCB 52. The separate illumination source 220 projects a light pattern 222 upward and off the splitter minor 210 through the vertical window 30 into the customer interface 200 and second FOV 216.

In the illustrated example embodiment of FIG. 4, the first FOV 214 is projected through the substantially vertical window 24 along with other FOVs from the plurality of cameras 36 and more particularly, the common camera 208 for imaging the target object 44. In the illustrated embodiment of FIG. 4, the first FOV 214 projection path through the substantially vertical window 24 is achieved by a fold mirror 218. Other FOVs from the plurality of cameras 36 for imaging the target object 44 are also projected from the horizontal widow 26 and/or vertical window 24.

Figure 5:
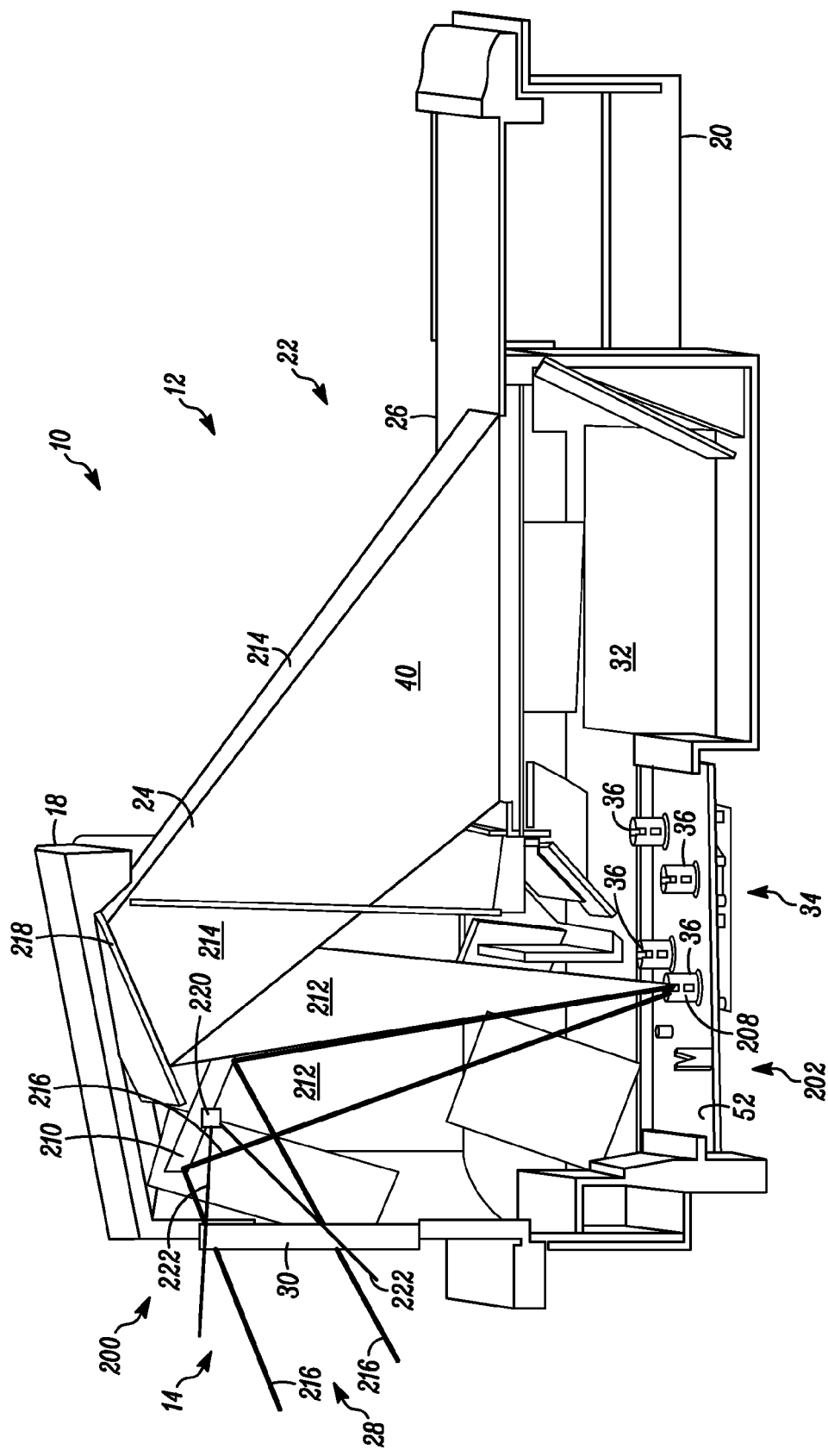
FIG. 5 is a medial cross sectional view of an optical scanner having a customer interface constructed in accordance with another example embodiment of the present disclosure.

Referring again to the figures and in particular to FIG. 5 is a medial cross sectional elevation view of the optical scanner 10 having a customer interface 200 constructed in accordance with one embodiment of the present disclosure. As stated above, the example embodiment of FIG. 5 illustrates a first scanning system 34 for imaging a target object 44 having a target barcode 42 on the first side 12 of the optical scanner 10 using a plurality of imaging cameras 36. The imaging and reading of the target barcode 42 is achieved by the process described above relating to FIG. 8. In addition to target barcodes 42, other indicia such as signature codes, fingerprint, soft barcodes, 1D and 2D barcodes, and the like can be imaged and read without departing from the spirit and scope of the claimed invention.

In the illustrated example embodiment of FIG. 5, the customer interface 200 is shown on the rear side 14 of the optical scanner 10 housing 16. The customer interface 200 comprises the second scanning system 202 that includes in the example embodiment of FIG. 5 a common camera 208 that is shared with the first scanning system 34 plurality of cameras 36. The second scanning system 202 further comprises a splitter mirror 210 that divides the FOV 212 of common camera 208 into a first field of view 214 for imaging the target barcode 42 of the target object 44 out the first window assembly 22 and a second field of view 216 for imaging a target object such as auxiliary data 206 found on an auxiliary object 204 out the second window assembly 28 at different or the same time.

The common camera 208 of FIG. 5 scans the auxiliary data 206 in the same manner described and shown in FIG. 8 as that of the target object 44. In addition to auxiliary data 206 being in form of a soft barcode on a cell phone (see FIG. 2), other indicia such as signature codes, fingerprint, hard and soft barcodes, 1D and 2D barcodes, and the like can be imaged and read without departing from the spirit and scope of the claimed invention. The second FOV 216 of the second scanning system 202 projected through the second window assembly 28 provides an area for the auxiliary object 204 to be positioned and imaged as illustrated in FIG. 2 within the customer interface 200. In the illustrated example embodiment of FIG. 5, a separate illumination source 220 is part of the second scanning system 202 used to increase the lighting for auxiliary objects 206 positioned in environments with deficient lighting or in situations where backlighting is not provided.

The separate illumination source 220 in the example embodiment of FIG. 5 is positioned in-line with the vertically oriented window 30 of the second window assembly 28. The separate illumination source 220 projects a light pattern 222 through the vertical window 30 into the customer interface 200 and second FOV 216.

In the illustrated example embodiment of FIG. 5, the first FOV 214 is projected through the substantially vertical window 24 along with other FOVs from the plurality of cameras 36 and more particularly, the common camera 208 for imaging the target object 44. In the illustrated embodiment of FIG. 5, the first FOV 214 projection path through the substantially vertical window 24 is achieved by a fold mirror 218. Other FOVs from the plurality of cameras 36 for imaging the target object 44 are also projected from the horizontal widow 26 and/or vertical window 24.

Figure 6:
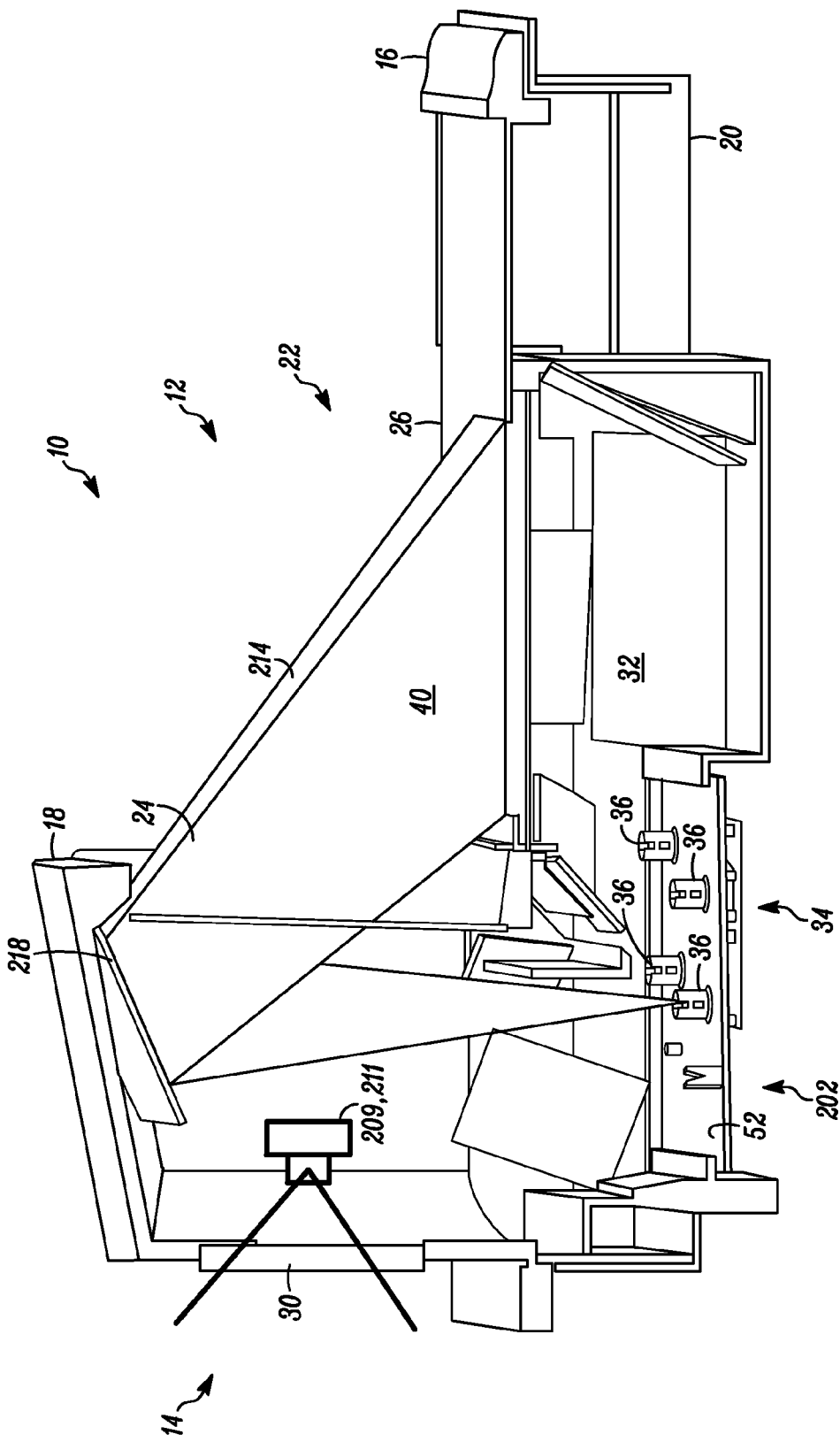
FIG. 6 is a medial cross sectional view of an optical scanner having a customer interface constructed in accordance with another example embodiment of the present disclosure.

Referring again to the figures and in particular to FIG. 6 is a medial cross sectional elevation view of the optical scanner 10 having a customer interface 200 constructed in accordance with one embodiment of the present disclosure. As stated above, the example embodiment of FIG. 6 illustrates a first scanning system 34 for imaging a target object 44 having a target barcode 42 on the first side 12 of the optical scanner 10 using a plurality of imaging cameras 36. The imaging and reading of the target barcode 42 is achieved by the process described above relating to FIG. 8. In addition to target barcodes 42, other indicia such as signature codes, fingerprint, soft barcodes, 1D and 2D barcodes, and the like can be imaged and read without departing from the spirit and scope of the claimed invention.

In the illustrated example embodiment of FIG. 6, the customer interface 200 is shown on the rear side 14 of the optical scanner 10 housing 16. The customer interface 200 comprises the second scanning system 202 that includes in the example embodiment of FIG. 6 a dedicated camera 209 that is independent from the first scanning system 34 plurality of cameras 36. The second scanning system 202 further comprises a second field of view 216 from the dedicated camera 209 that is independent from the first field of view 214 for imaging the target barcode 42 of the target object 44 out the first window assembly 22. The second field of view 216 images and read a target object such as auxiliary data 206 found on an auxiliary object 204 out the second window assembly 28 at different or the same time as target objects 44 and barcodes thereon 42 scanned out the first window assembly 22.

The dedicated camera 209 scans the auxiliary data 206 in the same manner described and shown in FIG. 8 as that of the target object 44. In addition to auxiliary data 206 being in form of a soft barcode on a cell phone (see FIG. 2), other indicia such as signature codes, fingerprint, hard and soft barcodes, 1D and 2D barcodes, and the like can be imaged and read without departing from the spirit and scope of the claimed invention. The second FOV 216 of the second scanning system 202 projected through the second window assembly 28 provides an area for the auxiliary object 204 to be positioned and imaged as illustrated in FIG. 2 within the customer interface 200. In the illustrated example embodiment of FIG. 6, a separate illumination source 211 having a light path the same as FOV 216 maybe needed as part of the second scanning system 202 used to increase the lighting for auxiliary objects 206 positioned in environments with deficient lighting or in situations where backlighting is not provided.

In the illustrated example embodiment of FIG. 6, the first FOV 214 is projected through the substantially vertical window 24 along with other FOVs from the plurality of cameras 36 for imaging the target object 44. In the illustrated embodiment of FIG. 6, the first FOV 214 projection path through the substantially vertical window 24 is achieved by a fold mirror 218. Other FOVs from the plurality of cameras 36 for imaging the target object 44 are also projected from the horizontal widow 26 and/or vertical window 24.

Referring again to the figures and in particular to FIG. 7 is a medial cross sectional elevation view of the optical scanner 10 having a customer interface 200 constructed in accordance with one embodiment of the present disclosure. As stated above, the example embodiment of FIG. 7 illustrates a first scanning system 34 for imaging a target object 44 having a target barcode 42 on the first side 12 of the optical scanner 10 using a laser scanning assembly 38. The scanning and reading of the target barcode 42 is achieved by the process described above relating to FIG. 7. In addition to target barcodes 42, other indicia such as signature codes, fingerprint, soft barcodes, and the like can be scanned and read without departing from the spirit and scope of the claimed invention.

In the illustrated example embodiment of FIG. 7, the customer interface 200 is shown on the rear side 14 of the optical scanner 10 housing 16. The customer interface 200 comprises the second scanning system 202 that includes in the example embodiment of FIG. 7 a dedicated camera 209 that is independent from the first scanning system 34 comprising a laser scanning assembly 38. The second scanning system 202 further comprises a second field of view 216 from the dedicated camera 209 that is independent from the first field of view 48 for scanning the target barcode 42 of the target object 44 out the first window assembly 22. The second field of view 216 images and read a target object such as auxiliary data 206 found on an auxiliary object 204 out the second window assembly 28 at different or the same time as target objects 44 and barcodes thereon 42 scanned out the first window assembly 22 discussed in detail in connection with FIG. 8.

The dedicated camera 209 scans the auxiliary data 206 in the same manner described and shown in FIG. 8. In addition to auxiliary data 206 being in form of a soft barcode on a cell phone (see FIG. 2), other indicia such as signature codes, fingerprint, hard and soft barcodes, 1D and 2D barcodes, and the like can be imaged and read without departing from the spirit and scope of the claimed invention. The second FOV 216 of the second scanning system 202 projected through the second window assembly 28 provides an area for the auxiliary object 204 to be positioned and imaged as illustrated in FIG. 2 within the customer interface 200. In the illustrated example embodiment of FIG. 7, a separate illumination source 211 having a light path the same as FOV 216 maybe needed as part of the second scanning system 202 used to increase the lighting for auxiliary objects 206 positioned in environments with deficient lighting or in situations where backlighting is not provided.

Figure 9:
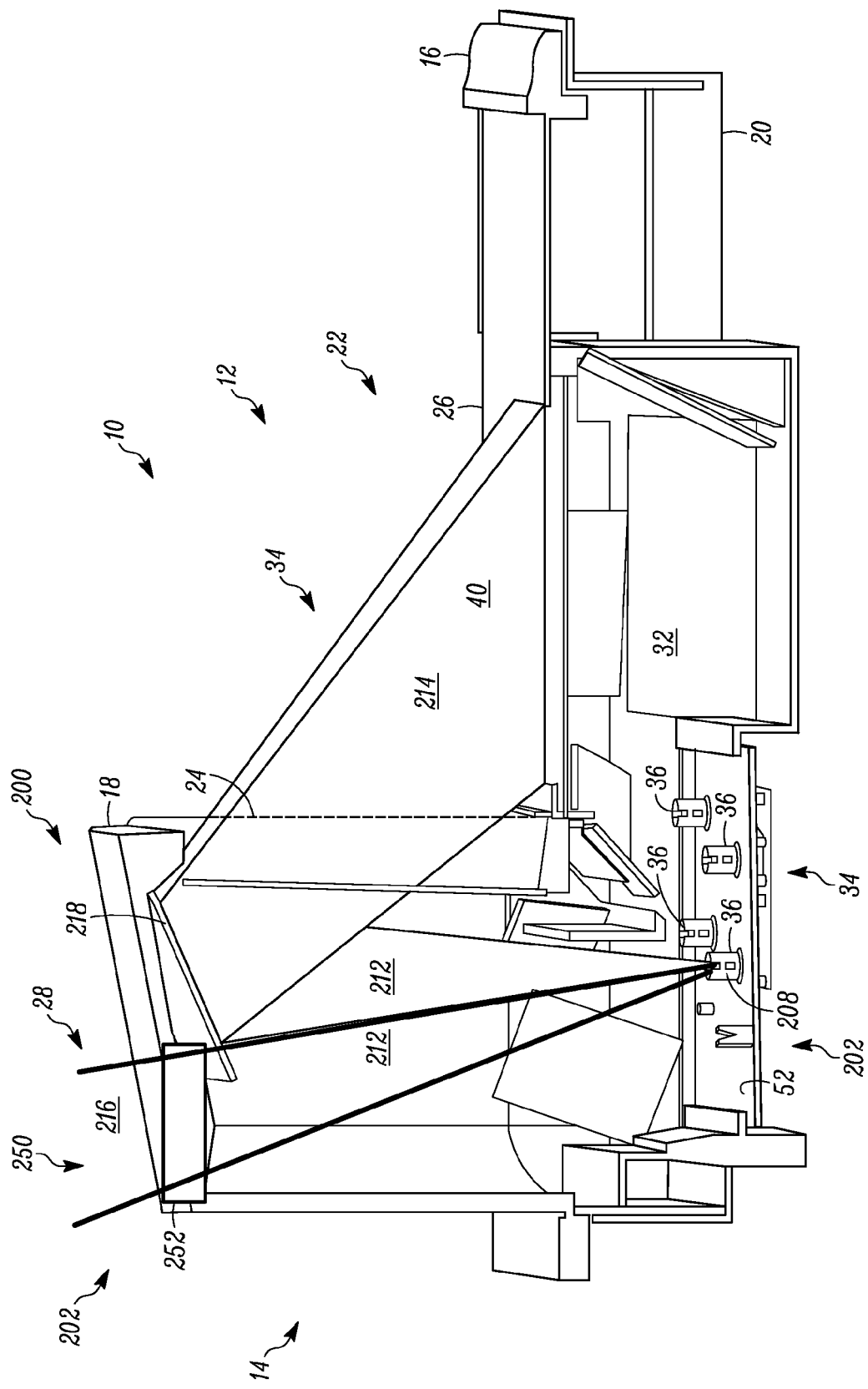
FIG. 9 is a medial cross sectional view of an optical scanner having a customer interface constructed in accordance with another example embodiment of the present disclosure.

FIG. 9 is a medial cross sectional view of an optical scanner 10 having a customer interface 200 of FIG. 2 constructed in accordance with one example embodiment of the present disclosure. As stated above, the example embodiment of FIG. 9 illustrates a first scanning system 34 for imaging a target object 44 having a target barcode 42 on the first side 12 of the optical scanner 10 using a plurality of imaging cameras 36 and the image of the auxiliary data 206 is processed in the same manner as described in FIG. 8. The imaging and reading of the target barcode 42 is achieved by the process described above relating to FIG. 8. In addition to target barcodes 42, other indicia such as signature codes, fingerprint, soft barcodes, 1D and 2D barcodes, and the like can be imaged and read without departing from the spirit and scope of the claimed invention.

In the illustrated example embodiment of FIG. 9, the customer interface 200 is shown on the top side 250 of the optical scanner 10 housing 16. The customer interface 200 comprises the second scanning system 202 that includes in the example embodiment of FIG. 9 a common camera 208 that is shared with the first scanning system 34 plurality of cameras 36. The second scanning system 202 further comprises a splitter minor 218 that divides the FOV 212 of common camera 208 into a first field of view 214 for imaging the target barcode 42 of the target object 44 out the first window assembly 22 and a second field of view 216 for imaging a target object such as auxiliary data 206 found on an auxiliary object 204 out the second window assembly 28 at different or the same time.

The common camera 208 of FIG. 9 scans the auxiliary data 206 in the same manner described and shown in FIG. 8 as that of the target object 44. In addition to auxiliary data 206 being in form of a soft barcode on a cell phone (see FIG. 2), other indicia such as signature codes, fingerprint, hard and soft barcodes, 1D and 2D barcodes, and the like can be imaged and read without departing from the spirit and scope of the claimed invention. The second FOV 216 of the second scanning system 202 projected through the second window assembly 28 provides an area for the auxiliary object 204 to be positioned and imaged as illustrated in FIG. 2 within the customer interface 200. In the illustrated example embodiment of FIG. 9, a separate illumination source is not required for auxiliary objects 206 positioned in environments with sufficient lighting or in situations where backlighting is provided for example by a cell phone.

In the illustrated example embodiment of FIG. 9, the first FOV 214 is projected through the substantially vertical window 24 along with other FOVs from the plurality of cameras 36 and more particularly, the common camera 208 for imaging the target object 44. In the illustrated embodiment of FIG. 9, the first FOV 214 projection path through the substantially vertical window 24 is achieved by a fold mirror 218. Other FOVs from the plurality of cameras 36 for imaging the target object 44 are also projected from the horizontal widow 26 and/or vertical window 24. While the second FOV 216 is projected through a transparent substantially horizontal window 252.

Figure 10:
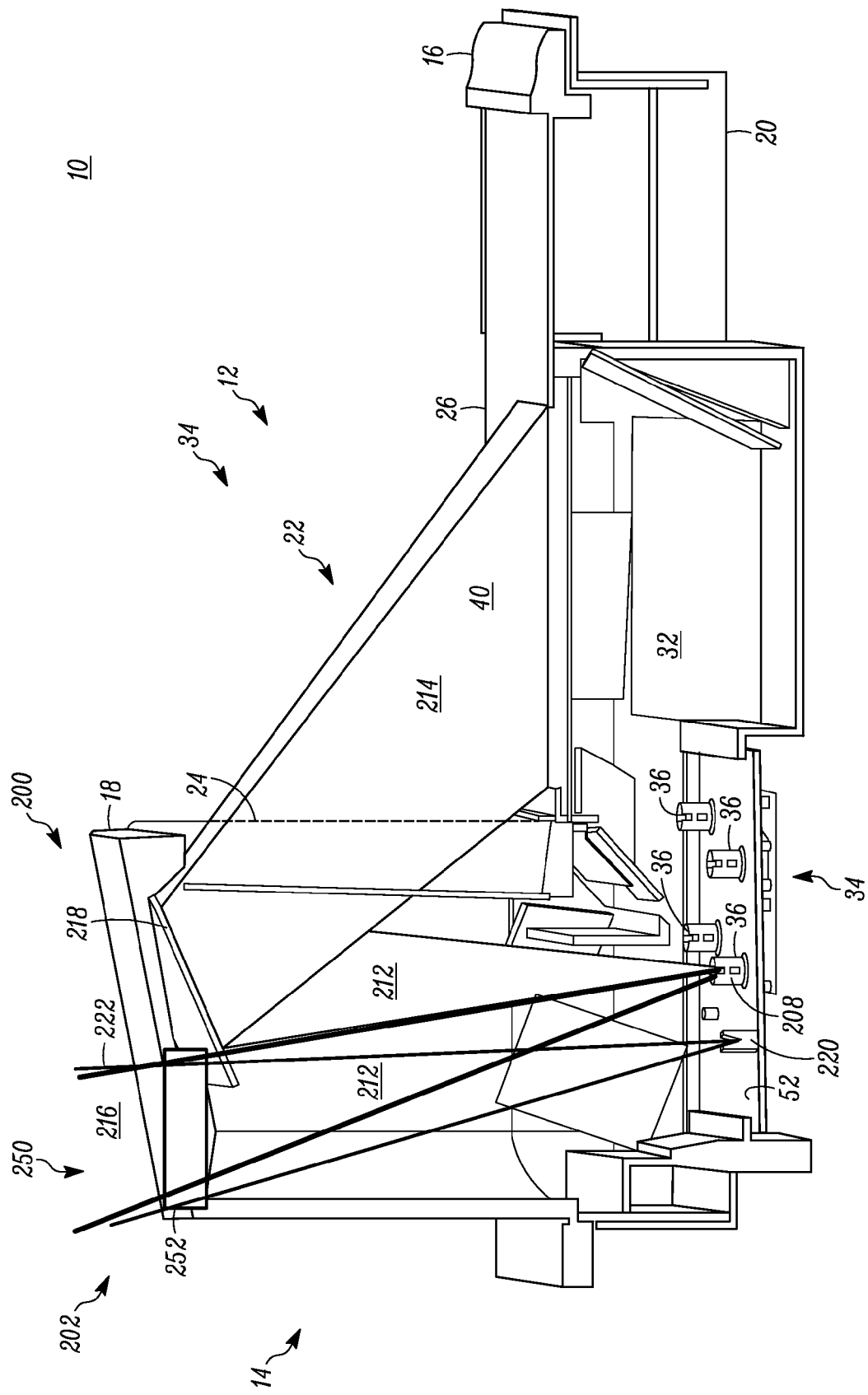
FIG. 10 is a medial cross sectional view of an optical scanner having a customer interface constructed in accordance with another example embodiment of the present disclosure.

Illustrated in FIG. 10 is a medial cross sectional elevation view of the optical scanner 10 having a customer interface 200 constructed in accordance with one embodiment of the present disclosure. As stated above, the example embodiment of FIG. 10 illustrates a first scanning system 34 for imaging a target object 44 having a target barcode 42 on the first side 12 of the optical scanner 10 using a plurality of imaging cameras 36. The imaging and reading of the target barcode 42 is achieved by the process described above relating to FIG. 8. In addition to target barcodes 42, other indicia such as signature codes, fingerprint, soft barcodes, 1D and 2D barcodes, and the like can be imaged and read without departing from the spirit and scope of the claimed invention.

In the illustrated example embodiment of FIG. 10, the customer interface 200 is shown on the top side 250 of the optical scanner 10 housing 16. The customer interface 200 comprises the second scanning system 202 that includes in the example embodiment of FIG. 10 a common camera 208 that is shared with the first scanning system 34 plurality of cameras 36. The second scanning system 202 further comprises a splitter minor 218 that divides the FOV 212 of common camera 208 into a first field of view 214 for imaging the target barcode 42 of the target object 44 out the first window assembly 22 and a second field of view 216 for imaging a target object such as auxiliary data 206 found on an auxiliary object 204 out the second window assembly 28 at different or the same time.

The common camera 208 of FIG. 10 scans the auxiliary data 206 in the same manner described and shown in FIG. 8 as that of the target object 44. In addition to auxiliary data 206 being in form of a soft barcode on a cell phone (see FIG. 2), other indicia such as signature codes, fingerprint, hard and soft barcodes, 1D and 2D barcodes, and the like can be imaged and read without departing from the spirit and scope of the claimed invention. The second FOV 216 of the second scanning system 202 projected through the second window assembly 28 provides an area for the auxiliary object 204 to be positioned and imaged as illustrated in FIG. 2 within the customer interface 200. In the illustrated example embodiment of FIG. 10, a separate illumination source 220 is part of the second scanning system 202 used to increase the lighting for auxiliary objects 206 positioned in environments with deficient lighting or in situations where backlighting is not provided.

The separate illumination source 220 in the example embodiment of FIG. 10 is positioned and coupled to the surface of the PCB 52. The separate illumination source 220 projects a light pattern 222 upward and off the splitter mirror 218 through a substantially horizontal window 252 into the customer interface 200 and second FOV 216.

In the illustrated example embodiment of FIG. 10, the first FOV 214 is projected through the substantially vertical window 24 along with other FOVs from the plurality of cameras 36 and more particularly, the common camera 208 for imaging the target object 44. In the illustrated embodiment of FIG. 10, the first FOV 214 projection path through the substantially vertical window 24 is achieved by a fold mirror 218. Other FOVs from the plurality of cameras 36 for imaging the target object 44 are also projected from the horizontal widow 26 and/or vertical window 24. While the second FOV 216 and illumination path 222 are projected through the transparent substantially horizontal window 252.

Figure 11:
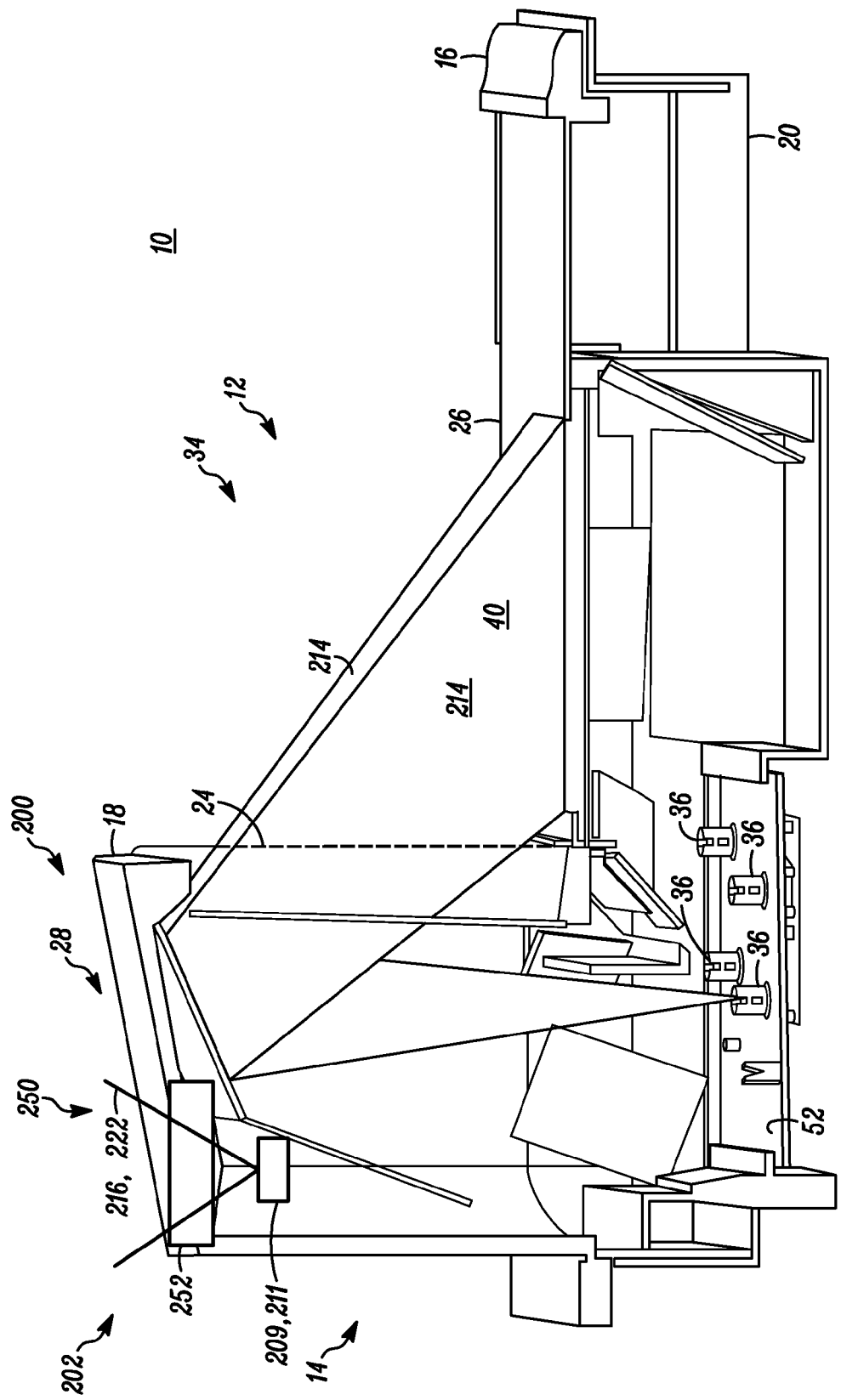
FIG. 11 is a medial cross sectional view of an optical scanner having a customer interface constructed in accordance with another example embodiment of the present disclosure.

Illustrated in FIG. 11 is a medial cross sectional elevation view of the optical scanner 10 having a customer interface 200 constructed in accordance with one embodiment of the present disclosure. As stated above, the example embodiment of FIG. 11 illustrates a first scanning system 34 for imaging a target object 44 having a target barcode 42 on the first side 12 of the optical scanner 10 using a plurality of imaging cameras 36. The imaging and reading of the target barcode 42 is achieved by the process described above relating to FIG. 8. In addition to target barcodes 42, other indicia such as signature codes, fingerprint, soft barcodes, 1D and 2D barcodes, and the like can be imaged and read without departing from the spirit and scope of the claimed invention.

In the illustrated example embodiment of FIG. 11, the customer interface 200 is shown on the top side 250 of the optical scanner 10 housing 16. The customer interface 200 comprises the second scanning system 202 that includes in the example embodiment of FIG. 11 a dedicated camera 209 that is independent from the first scanning system 34 plurality of cameras 36. The second scanning system 202 further comprises a second field of view 216 from the dedicated camera 209 that is independent from the first field of view 214 for imaging the target barcode 42 of the target object 44 out the first window assembly 22. The second field of view 216 images and read a target object such as auxiliary data 206 found on an auxiliary object 204 out the second window assembly 28 at different or the same time as target objects 44 and barcodes thereon 42 scanned out the first window assembly 22.

The dedicated camera 209 scans the auxiliary data 206 in the same manner described and shown in FIG. 8 as that of the target object 44. In addition to auxiliary data 206 being in form of a soft barcode on a cell phone (see FIG. 2), other indicia such as signature codes, fingerprint, hard and soft barcodes, 1D and 2D barcodes, and the like can be imaged and read without departing from the spirit and scope of the claimed invention. The second FOV 216 of the second scanning system 202 projected through the second window assembly 28 provides an area for the auxiliary object 204 to be positioned and imaged as illustrated in FIG. 2 within the customer interface 200. In the illustrated example embodiment of FIG. 11, a separate illumination source 211 having a light path the same as FOV 216 maybe needed as part of the second scanning system 202 used to increase the lighting for auxiliary objects 206 positioned in environments with deficient lighting or in situations where backlighting is not provided.

In the illustrated example embodiment of FIG. 11, the first FOV 214 is projected through the substantially vertical window 24 along with other FOVs from the plurality of cameras 36 for imaging the target object 44. In the illustrated embodiment of FIG. 11, the first FOV 214 projection path through the substantially vertical window 24 is achieved by a fold mirror 218. Other FOVs from the plurality of cameras 36 for imaging the target object 44 are also projected from the horizontal widow 26 and/or vertical window 24. While the second FOV 216 and illumination path 222 are projected through the transparent substantially horizontal window 252.

Figure 12:
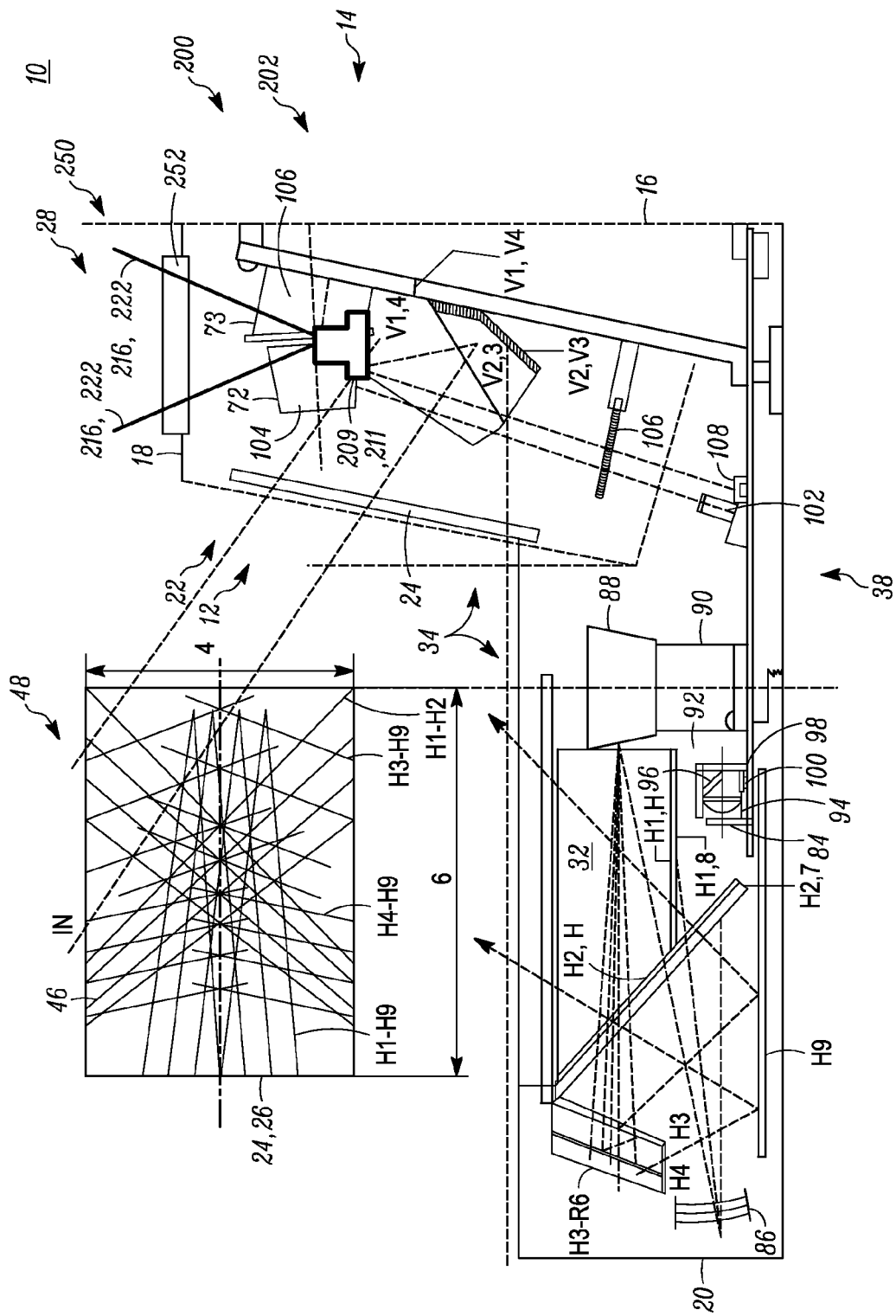
FIG. 12 is a medial cross sectional view of an optical scanner having a customer interface constructed in accordance with another example embodiment of the present disclosure.

Illustrated in FIG. 12 is a medial cross sectional elevation view of the optical scanner 10 having a customer interface 200 constructed in accordance with one embodiment of the present disclosure. As stated above, the example embodiment of FIG. 12 illustrates a first scanning system 34 for imaging a target object 44 having a target barcode 42 on the first side 12 of the optical scanner 10 using a laser scanning assembly 38. The scanning and reading of the target barcode 42 is achieved by the process described above relating to FIG. 12. In addition to target barcodes 42, other indicia such as signature codes, fingerprint, soft barcodes, and the like can be scanned and read without departing from the spirit and scope of the claimed invention.

The optical scanner 10 illustrated in FIG. 12 is constructed in accordance with another example embodiment of the present disclosure wherein the first scanning system 34 comprises the laser scanning assembly 38. Situated within the lower housing arrangement 20 is a light source 84, preferably a laser, generates light beam that is reflected off spherical reflector/collector 86 and onto rotating polygon mirror 88. In one example embodiment, the rotating polygon mirror 88 has four reflecting facets rotating around a vertical axis and is driven by motor 90. The light beam is then reflected from the mirror 88 onto an array of minors located in the interior region 32 of the housing 16 and out the horizontal window 26.

A target object 44 when positioned within the scan lines 46 forming the laser FOV 48, light is reflected from the target barcode 42 back through horizontal window 26 off one or more internal mirrors therein, to the rotating polygon mirror 88 and spherical reflector/collector 86. This light reflected off the reflector/collector 86 projects onto a collection assembly 92, which comprises lens 94, fold minor 96, filter 98, and photodiode 100.

Situated within the upper housing arrangement 22 is a light source 102, preferably a laser, generates light beam that is reflected off and onto rotating polygon mirror 104. In one example embodiment, the rotating polygon minor 104 has four reflecting facets rotating around a vertical axis and is driven by motor 106. The light beam is then reflected from the minor 104 onto an array of minors located in the interior region 32 of the housing 16 and out the vertical window 24.

A target object 44 when positioned within the scan lines 46 forming the laser FOV 48, light is reflected from the target barcode 42 back through vertical window 24 off one or more internal minors therein, to the rotating polygon minor 104, which it is then reflected toward collector lens . This light reflected off the reflector/collector 86 projects onto a collection assembly 92, which comprises lens 94, fold minor 96, filter 98, and photodiode 100.

Each photodiode 100 and 108 has its own amplifier and digitizer and the outputs of the digitizers go to a decoder designed to accept two digitized signals simultaneously. The decoded signal is then output to a host computer forming a mnemonic or understandable output signal as appreciated by one skilled in the art. Further details of a laser scanning assembly 38 is described in U.S. Pat. No. 6,854,655 entitled TWO WINDOW OPTICAL SCANNER, which is incorporated herein by reference in its entirety.

In the illustrated example embodiment of FIG. 12, the customer interface 200 is shown on the top side 250 of the optical scanner 10 housing 16. The customer interface 200 comprises the second scanning system 202 that includes in the example embodiment of FIG. 12 a dedicated camera 209 that is independent from the first scanning system 34 comprising a laser scanning assembly 38. The second scanning system 202 further comprises a second field of view 216 from the dedicated camera 209 that is independent from the first field of view 48 for scanning the target barcode 42 of the target object 44 out the first window assembly 22. The second field of view 216 images and read a target object such as auxiliary data 206 found on an auxiliary object 204 out the second window assembly 28 at different or the same time as target objects 44 and barcodes thereon 42 scanned out the first window assembly 22 discussed in detail in connection with FIG. 8.

The dedicated camera 209 scans the auxiliary data 206 in the same manner described and shown in FIG. 8. In addition to auxiliary data 206 being in form of a soft barcode on a cell phone (see FIG. 2), other indicia such as signature codes, fingerprint, hard and soft barcodes, 1D and 2D barcodes, and the like can be imaged and read without departing from the spirit and scope of the claimed invention. The second FOV 216 of the second scanning system 202 projected through the second window assembly 28 provides an area for the auxiliary object 204 to be positioned and imaged as illustrated in FIG. 2 within the customer interface 200. In the illustrated example embodiment of FIG. 12, a separate illumination source 211 having a light path the same as FOV 216 maybe needed as part of the second scanning system 202 used to increase the lighting for auxiliary objects 206 positioned in environments with deficient lighting or in situations where backlighting is not provided.

Figure 13:
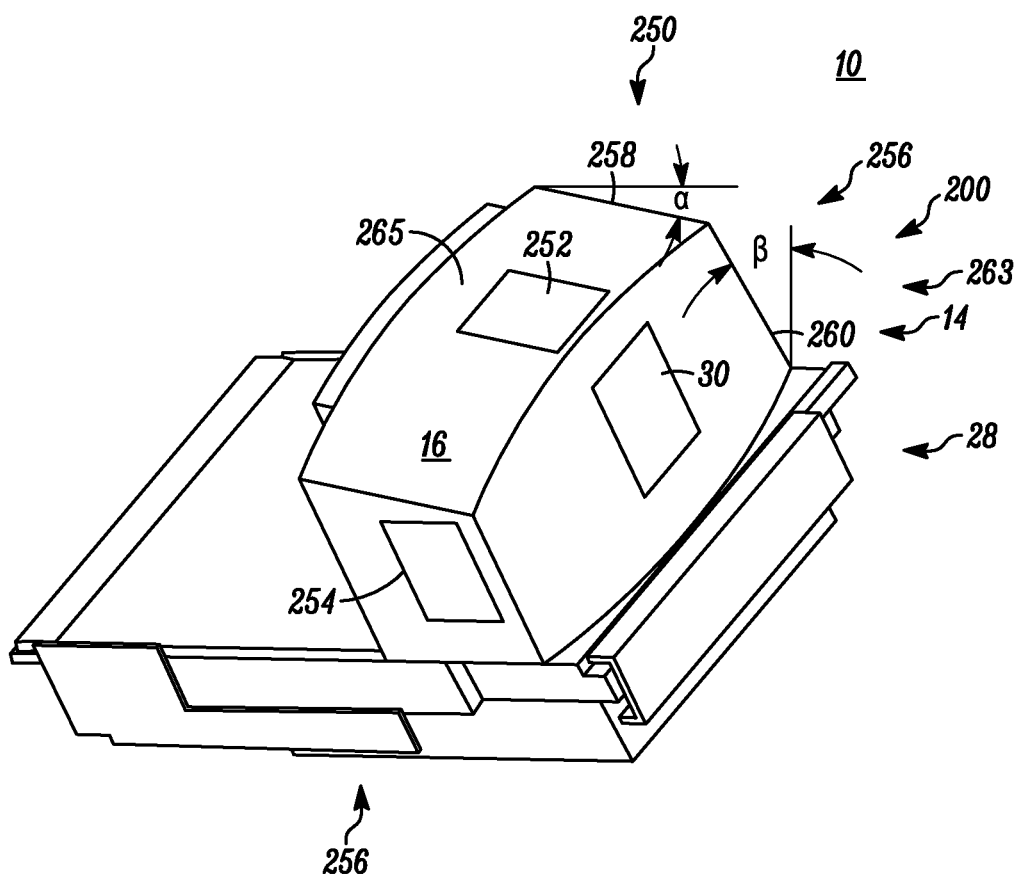
FIG. 13 is a perspective view of an optical scanner having a customer interface constructed in accordance with another example embodiment of the present disclosure.

Illustrated in FIG. 13 is a perspective view of an optical scanner 10 having a customer interface 200 constructed in accordance with another example embodiment of the present disclosure. The customer interface 200 comprises a second scanning system 202 similar to any one or combinations of the second scanning assemblies discussed in the example embodiments accompanied with respective figures discussed above. The customer interface 200 further comprises a second window assembly 28 that includes a substantially vertical transparent window 30 on the rear side 14 of the housing 16 of the optical scanner 10. Alternatively, the customer interface 200 further comprises a second window assembly 28 that includes a substantially horizontal transparent window 252 on the top side 250 of the housing 16 of the optical scanner 10.

Yet in another alternative example embodiment, the customer interface 200 further comprises a second window assembly 28 that includes a substantially vertical transparent window 254 on one of the sides 256 of the housing 16 of the optical scanner 10. In another example embodiment, a plane 258 or 260 locating the second window assembly 28 is at an angle $\alpha$ or $\beta$, respectively from the horizontal or vertical plane. While in another example embodiment, the second window assembly 28 comprises any combination of the transparent windows 30, 252, and 254 within substantially vertical and/or horizontal planes and/or planes 258 and/or 260 at some angle $\alpha$ and/or $\beta$, respectively from the vertical and/or horizontal planes. In yet another example embodiment, the second window assembly 28 comprises the transparent window 252 on the top side 250 of the housing and one or both transparent windows 254 and 30 located on perimetrical sides 263 defined by side 256 and rear side 14 located on an upper portion 265 of the housing 16.

Figure 14:
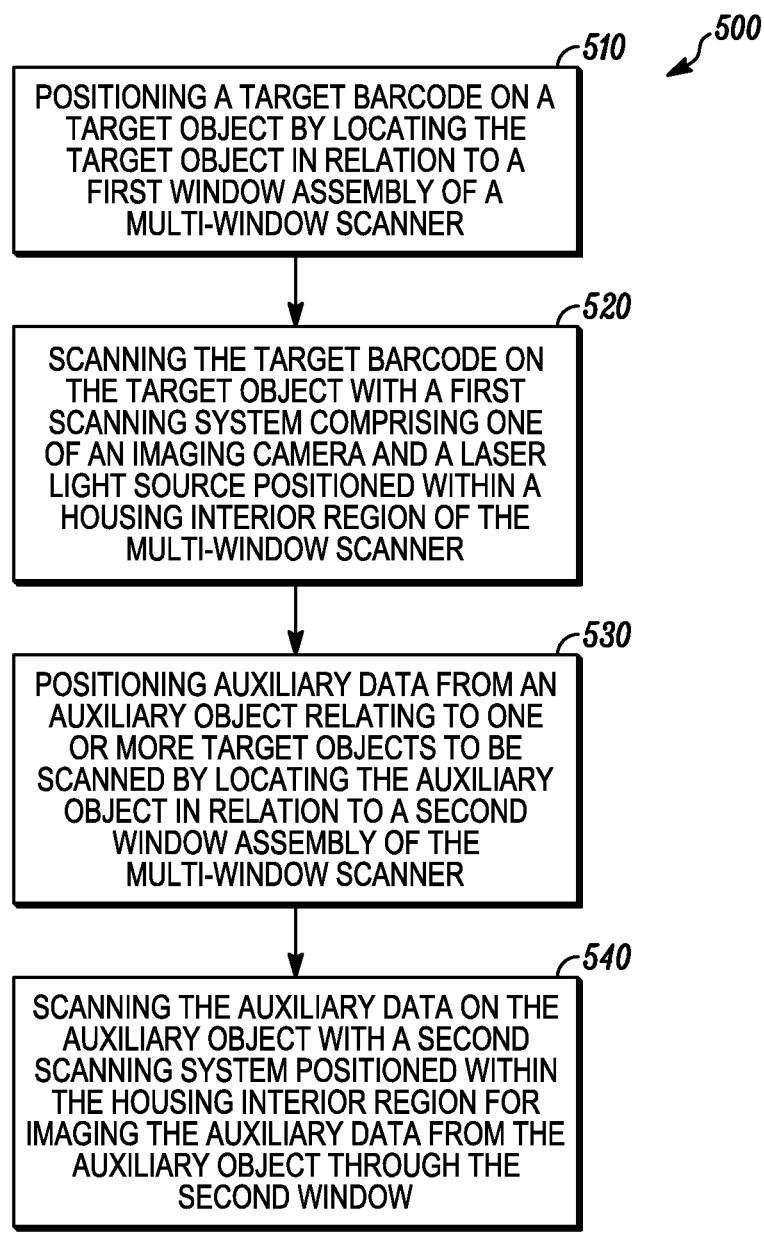
FIG. 14 is a flowchart of an exemplary embodiment of the present disclosure depicting a process for operating a multi-window scanner having a customer interface for imaging a target object and auxiliary object.

Illustrated in FIG. 14 is a flowchart of an exemplary embodiment of the present disclosure depicting a process 500 for operating a multi-window scanner having a customer interface for imaging a target object and auxiliary object. At 510, the process 500 comprises the step of positioning a target barcode on a target object by locating the target object in relation to a first window assembly of a multi-window scanner. At 520, the process 500 comprises the step of scanning the target barcode on the target object with a first scanning system comprising one of an imaging camera and a laser light source positioned within a housing interior region of the multi-window scanner. At 530, the process 500 comprises the step of positioning auxiliary data from an auxiliary object relating to one or more target objects being scanned by locating the auxiliary object in relation to a second window assembly of the multi-window scanner. At 540, the process 500 comprises the step of scanning the auxiliary data on the auxiliary object with a second scanning system positioned within the housing interior region for imaging the auxiliary data from the auxiliary object through the second window.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:
1. A multi-window scanner comprising:
a housing supporting a first window assembly for scanning a target barcode on a target object during a transaction in which the target object is positioned in relation to the housing for reading the target barcode, the housing defining an interior region of the multi-window scanner, wherein said housing further comprises a first side locating said first window assembly, the first window assembly comprising one substantially vertically oriented transparent window located on the first side of the housing and one substantially horizontally oriented transparent window;

a first scanning system comprising one of an imaging camera and a light source positioned within the housing interior region defining a field of view for reading the target barcode located on the target object;

a second window assembly supported by the housing for reading auxiliary data from an auxiliary object positioned within a customer interface during the transaction, wherein the second window assembly comprises a substantially vertically oriented transparent window located on a second side of the housing that is accessible to a customer and further wherein the auxiliary data includes further information required to complete the transaction associated with the target object ,and wherein the direction that the second side of the housing is facing differs from the direction that the first side of the housing is facing by at least 90 degrees; and the customer interface comprising a second scanning system positioned within said housing interior region for imaging said auxiliary data from said auxiliary object through said second window assembly.

2. The multi-window scanner of claim 1 wherein said first scanning system comprises said imaging camera and said second scanning system comprises a splitter mirror for dividing a field of view from said camera into first and second fields of view, said first field of view for scanning said target barcode on said target object and said second field of view for scanning said auxiliary data on said auxiliary object.

3. The multi-window scanner of claim 2 wherein said second scanning system further comprises an illumination source for illuminating said auxiliary object during the imaging of the auxiliary data.

4. The multi-window scanner of claim 3 wherein said illumination source is positioned on a printed circuit board supporting said imaging camera within said interior region of said housing.

5. The multi-window scanner of claim 4 wherein said illumination source utilizes said splitter mirror for projecting illumination from the interior region out through said second window assembly.

6. The multi-window scanner of claim 3 wherein said illumination source is positioned in-line with said second window assembly.

7. The multi-window scanner of claim 1 wherein said first scanning system comprises said light source for scanning said target barcode on said target object and said second scanning system comprises an imaging camera dedicated to imaging said auxiliary data on said auxiliary object.

8. The multi-window scanner of claim 1 wherein said auxiliary data found on said auxiliary object comprises discount information in the form of one or more coupons relating to one or more target objects being scanned.

9. The multi-window scanner of claim 1 wherein said auxiliary data found on said auxiliary object comprises consumer information in the form of a driver's license or loyalty card.

10. A method of operating a multi-window scanner for imaging a target object and an auxiliary object comprising:
  positioning a target barcode on the target object by locating the target object in relation to a first window assembly of the multi-window scanner;
  scanning the target barcode on said target object during a transaction with a first scanning system comprising one of an imaging camera and a light source positioned within a housing interior region of the multi-window scanner;
  positioning auxiliary data from the auxiliary object positioned within a customer interface during the transaction and further wherein the auxiliary data includes further information required to complete the transaction process associated with the target object by locating the auxiliary object in relation to a second window assembly supported by the housing, wherein the second window assembly is located on a side of the housing that is accessible to a customer;
  scanning the auxiliary data on said auxiliary object through the customer interface comprising a second scanning system positioned within said housing interior region for imaging said auxiliary data from said auxiliary object through said second window; and
  positioning said first window assembly in a first side of said housing, the first window assembly comprising one substantially vertically oriented transparent window and one substantially horizontally oriented transparent window and the method further comprising positioning said second window assembly in a second side of said housing, the second window assembly comprising a substantially vertically oriented transparent window.

11. The method of claim 10 further comprising positioning a splitter mirror for dividing a field of view from said camera into first and second fields of view, said first field of view for scanning said target barcode on said target object and said second field of view for scanning said auxiliary data on said auxiliary object.

12. The method of claim 10 further comprising utilizing in said first scanning system said light source for scanning said target barcode on said target object and utilizing in said second scanning system said imaging camera dedicated to imaging said auxiliary data on said auxiliary object.

13. The method of claim 11 further comprising utilizing in said second scanning system an illumination source for illuminating said auxiliary object during the imaging of the auxiliary data.

14. A multi-window scanner having a customer interface comprising:
  a housing supporting first window and second window assemblies, said first window assembly being located on a first side of said housing for scanning a target barcode on a target object during a transaction in which the target object is positioned in relation to the housing for reading the target barcode and said second window assembly being located on a second side of said housing opposite said first side for reading auxiliary data from an auxiliary object positioned within the customer interface during the transaction and further wherein the auxiliary data includes further information required to complete the transaction associated with the target object;
  said first window assembly comprising one substantially vertically oriented transparent window located on the first side of said housing and one substantially horizontally oriented transparent window;
  said second window assembly comprising a substantially vertically oriented transparent window located on the second side of said housing that is accessible to a customer;
  a first scanning system comprising one of an imaging camera and a light source positioned within the housing interior region defining a first field of view through said first window assembly; and
  the customer interface comprising a second scanning system positioned within said housing interior region defining a second field of view through said second window assembly.

15. The multi-window scanner having a customer interface of claim 14 wherein said first scanning system comprises said imaging camera and said second scanning system comprises a splitter mirror for dividing a field of view from said camera into said first and said second fields of view.

16. The multi-window scanner having a customer interface of claim 15 wherein said third window system further comprises one of a substantially horizontal transparent window and a substantially vertical transparent window.

17. The multi-window scanner having a customer interface of claim 14 wherein said housing includes an upper portion supporting said third window system, wherein said third window system further comprises a transparent window located on a top side of said upper portion of said housing and at least one transparent window located on a parametrical side of said upper portion of said housing.

18. A multi-window scanner comprising:

a housing supporting a first window assembly for scanning a target barcode on a target object during a transaction in which the target object is positioned in relation to the housing for reading the target barcode, the housing defining an interior region of the multi-window scanner, wherein said housing further comprises a first side locating said first window assembly, the first window assembly comprising one substantially vertically oriented transparent window located on the first side of the housing and one substantially horizontally oriented transparent window;

a first scanning system comprising one of an imaging camera and a light source positioned within the housing interior region defining a field of view for reading the target barcode located on the target object;

a second window assembly supported by the housing for reading auxiliary data from an auxiliary object positioned within a customer interface during the transaction, wherein the second window assembly comprises a substantially vertically oriented transparent window located on a second side of the housing that is accessible to a customer and further wherein the auxiliary data includes further information required to complete the transaction associated with the target object, and wherein the direction that the second side of the housing is facing differs from the direction that the first side of the housing is facing by an angle of substantially 90 degrees; and the customer interface comprising a second scanning system positioned within said housing interior region for imaging said auxiliary data from said auxiliary object through said second window assembly.

\* \* \* \* \*